United States Patent
Inoue et al.

(10) Patent No.: US 7,614,053 B2
(45) Date of Patent: *Nov. 3, 2009

(54) METHODS AND APPARATUS FOR TASK MANAGEMENT IN A MULTI-PROCESSOR SYSTEM

(75) Inventors: Keisuke Inoue, Tokyo (JP); Tatsuya Iwamoto, Tokyo (JP); Masahiro Yasue, Tokyo (JP)

(73) Assignee: Sony Computer Entertainment Inc. (JP)

( * ) Notice: Subject to any disclaimer, the term of this patent is extended or adjusted under 35 U.S.C. 154(b) by 884 days.

This patent is subject to a terminal disclaimer.

(21) Appl. No.: 10/783,246

(22) Filed: Feb. 20, 2004

(65) Prior Publication Data

US 2005/0188373 A1    Aug. 25, 2005

(51) Int. Cl.
*G06F 9/455* (2006.01)
*G06F 9/46* (2006.01)

(52) U.S. Cl. .................... 718/100; 718/1; 718/102; 718/103

(58) Field of Classification Search .............. 718/1, 718/100, 101, 102, 103, 104, 105, 107
See application file for complete search history.

(56) References Cited

U.S. PATENT DOCUMENTS

| | | | |
|---|---|---|---|
| 4,394,727 A | 7/1983 | Hoffman et al. | |
| 4,394,730 A | 7/1983 | Suzuki et al. | |
| 4,837,688 A | 6/1989 | Cronauer et al. | |
| 5,349,656 A * | 9/1994 | Kaneko et al. | 718/102 |
| 5,379,428 A | 1/1995 | Belo | |
| 5,452,452 A | 9/1995 | Gaetner et al. | |
| 5,469,571 A | 11/1995 | Bunnell | |
| 5,592,671 A * | 1/1997 | Hirayama | 718/104 |
| 5,630,128 A | 5/1997 | Farrell et al. | |
| 5,826,081 A | 10/1998 | Zolnowsky | |
| 6,243,735 B1 * | 6/2001 | Imanishi et al. | 718/102 |
| 6,321,308 B1 * | 11/2001 | Arnon et al. | 711/147 |
| 6,904,483 B2 * | 6/2005 | Koning et al. | 710/244 |
| 7,062,766 B2 | 6/2006 | Ronkka et al. | |

(Continued)

FOREIGN PATENT DOCUMENTS

| | | | |
|---|---|---|---|
| EP | 459931 A2 * | 12/1991 | |
| EP | 0 750 255 A | 12/1996 | |
| EP | 0 459 931 A | 12/2001 | |
| JP | 08241212 A * | 9/1996 | |
| JP | 9237256 | 9/1997 | |
| JP | 2002091843 | 3/2002 | |
| JP | 2002366533 | 12/2002 | |
| KR | 2003-84553 | 11/2003 | |

OTHER PUBLICATIONS

Huedo, Edwardo, et al.: "Experiences on Grid Resource Selection Considering Resource Proximity" Grid Computing. First European Across Grids Conference, Feb. 14, 2003, pp. 1-8.

(Continued)

*Primary Examiner*—Meng-Ai An
*Assistant Examiner*—Abdullah Al Kawsar
(74) *Attorney, Agent, or Firm*—Lerner, David, Littenberg, Krumholz & Mentlik, LLP

(57) ABSTRACT

Methods and apparatus are provided for managing processor tasks in a multi-processor computing system. The system is operable to store the processor tasks in a shared memory that may be accessed by a plurality of sub-processing units of the multi-processor computing system; and permit the sub-processing units to determine which of the processor tasks should be copied from the shared memory and executed based on priorities of the processor tasks.

43 Claims, 32 Drawing Sheets

U.S. PATENT DOCUMENTS

| | | | |
|---|---|---|---|
| 7,080,215 B2 | 7/2006 | Ueno et al. | |
| 7,178,145 B2 * | 2/2007 | Bono | 718/100 |
| 7,389,508 B2 * | 6/2008 | Aguilar et al. | 718/104 |
| 7,516,456 B2 * | 4/2009 | Aguilar et al. | 718/102 |
| 2002/0002578 A1 | 1/2002 | Yamashita | |
| 2005/0081201 A1 * | 4/2005 | Aguilar et al. | 718/100 |

OTHER PUBLICATIONS

Krauter, Klaus, et al.: "A taxonomy and survey of grid resource systems for distributed computing" Software—Practice and Experience, 2002; pp. 135-164, XP-001091827, vol. 32, No. 2, Feb. 2002.

Liu, Chuang, et al.: "Design and Evaluation of a Resource Selection Framework for Grid Applications" Proceedings of the 11th IEEE International Symposium on High Performance Distributed Computing, 2002, pp. 63-72, Jul. 2002.

PCT/ISA/210 International Search Report dated Nov. 14, 2005.

Tanenbaum, Andrew S: "Moderne Betriebssystems, 2. Auflage (part)" NN, vol. 2, 2002, pp. 92-96, 160-163, 542, 543, 550-553, 558-561.

Black D L, "Scheduling Support for Concurrency and Parallelism in the Mach Operating System", Computer IEEE Service Center, Los Alamitos, Ca., vol. 23, No. 5, May 1, 1990, pp. 35-43.

Curran et al., "A comaprison of basic CPU schedulign algorithms for multiprocessor Unix", Computer systems, 1990, pp. 1-15.

* cited by examiner

FIG. 5

TASK TABLE

280

| T1 | | T2 | | T3 | | T4 | |
|---|---|---|---|---|---|---|---|
| PREV T9 | NEXT T8 | PREV T4 | NEXT T10 | PREV T5 | NEXT T7 | PREV T10 | NEXT T2 |
| STAT ready | PRI 1 | STAT ready | PRI 2 | STAT ready | PRI 3 | STAT ready | PRI 2 |
| T5 | | T6 | | T7 | | T8 | |
| PREV T7 | NEXT T3 | PREV T8 | NEXT T9 | PREV T3 | NEXT T5 | PREV T1 | NEXT T6 |
| STAT ready | PRI 3 | STAT ready | PRI 1 | STAT ready | PRI 3 | STAT ready | PRI 1 |
| T9 | | T10 | | | | | |
| PREV T6 | NEXT T1 | PREV T2 | NEXT T4 | | | | |
| STAT ready | PRI 1 | STAT ready | PRI 2 | | | | |

FIG. 7

TASK QUEUE      <u>282</u>

| PRIORITY | HEAD | TAIL |
|---|---|---|
| 1 | T1 | T9 |
| 2 | T10 | T2 |
| 3 | T7 | T3 |
| 4 | -- | -- |
| 5 | -- | -- |
| 6 | -- | -- |
| 7 | -- | -- |
| 8 | -- | -- |
| ⋮ | | |
| n | -- | -- |

FIG. 20
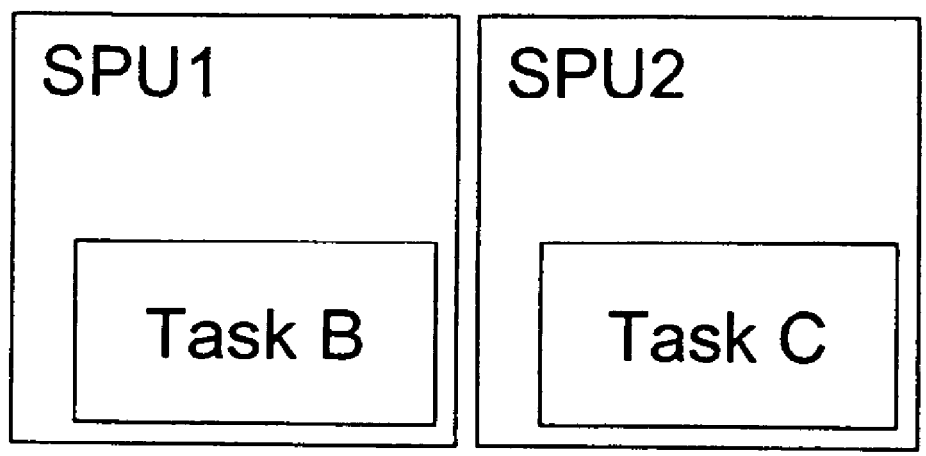
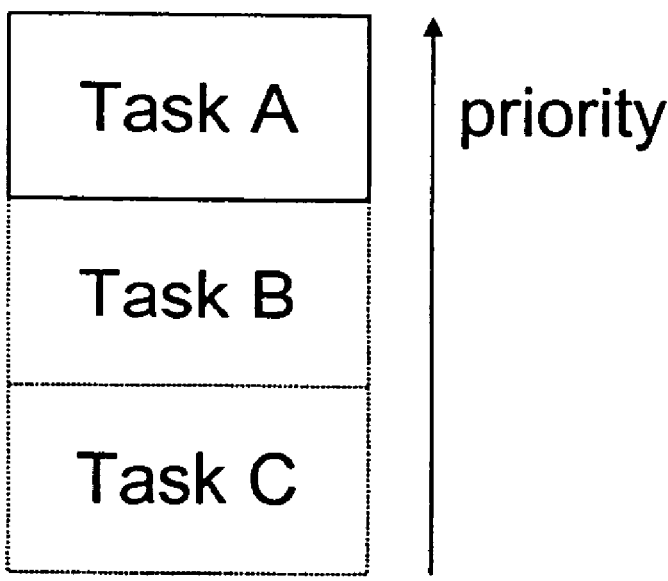

FIG. 23
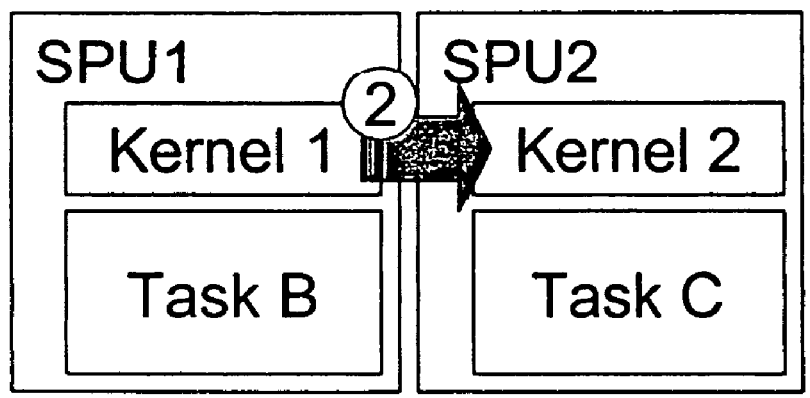
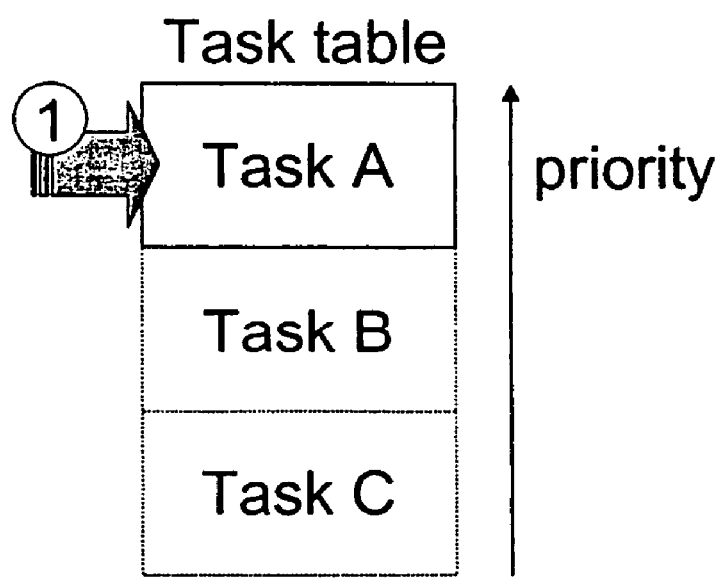

FIG. 25
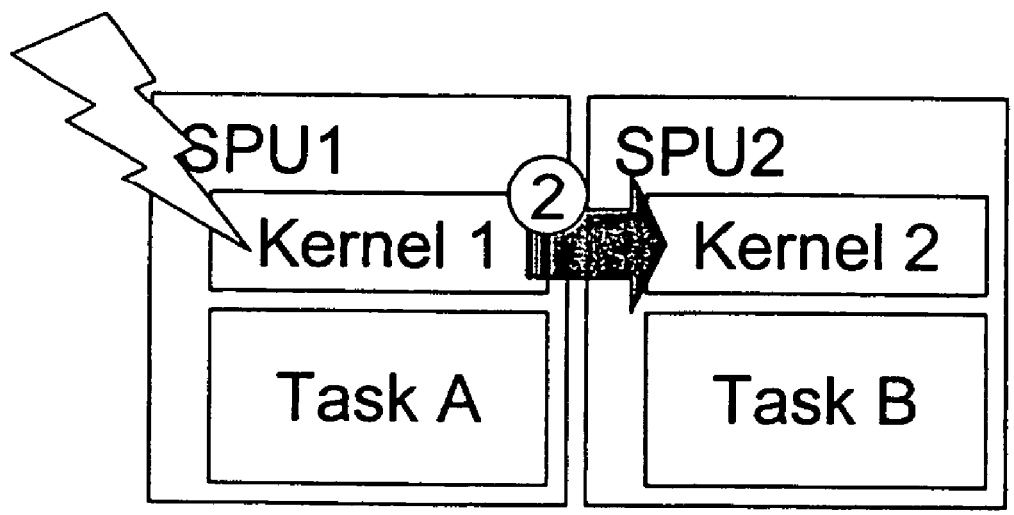
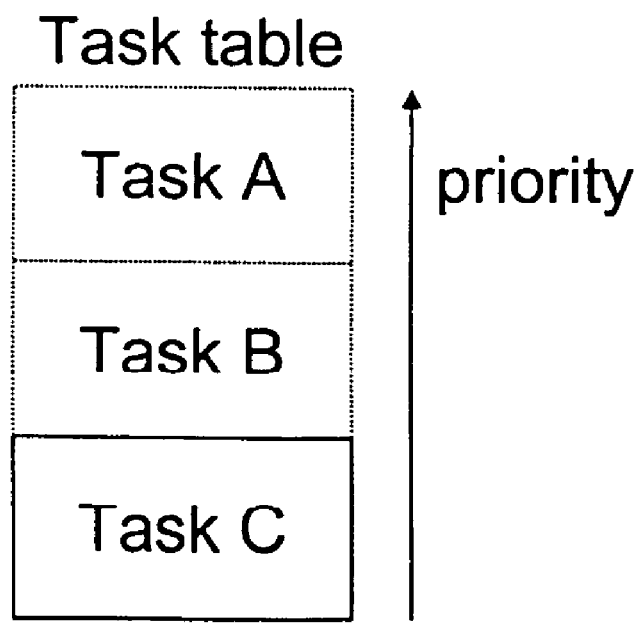

FIG. 26
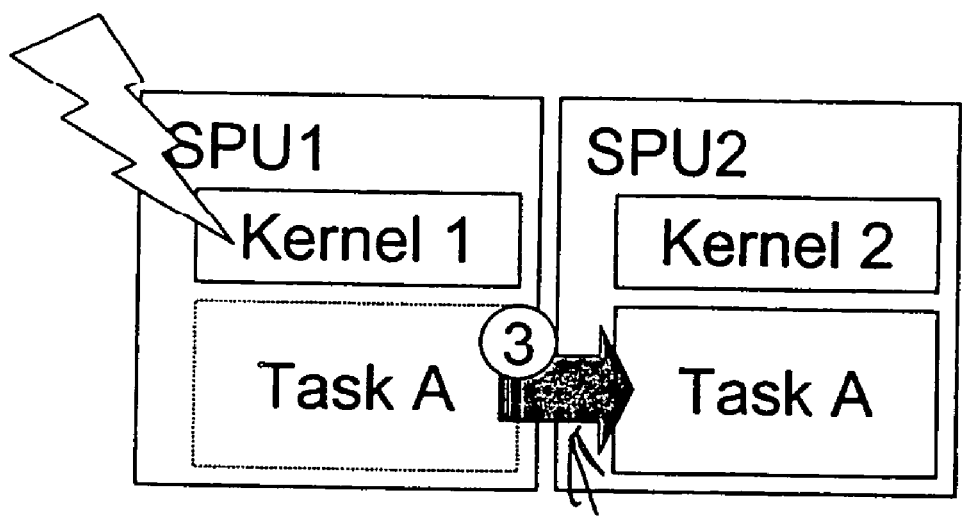
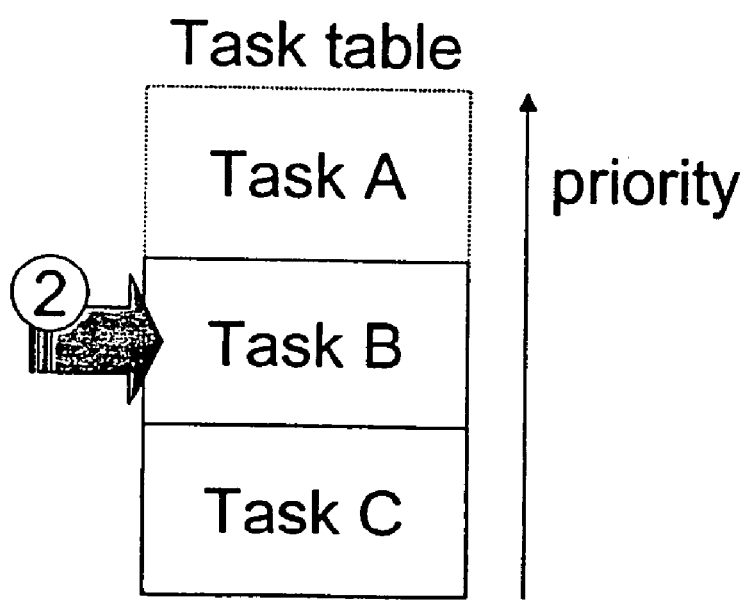

METHODS AND APPARATUS FOR TASK MANAGEMENT IN A MULTI-PROCESSOR SYSTEM

BACKGROUND OF THE INVENTION

The present invention relates to methods and apparatus for managing processor tasks in a multi-processing system and, in particular, for scheduling and executing the processor tasks among the sub-processing units of the multi-processing system on a substantially self governing basis.

Real-time, multimedia applications are becoming increasingly important. These applications require extremely fast processing speeds, such as many thousands of megabits of data per second. While single processing units are capable of fast processing speeds, they cannot generally match the processing speeds of multi-processor architectures. Indeed, in multi-processor systems, a plurality of sub-processors can operate in parallel (or at least in concert) to achieve desired processing results.

The types of computers and computing devices that may employ multi-processing techniques are extensive. In addition to personal computers (PCs) and servers, these computing devices include cellular telephones, mobile computers, personal digital assistants (PDAs), set top boxes, digital televisions and many others.

Real-time, multimedia software applications are constructed of processing code, such as processing instructions and data. A collection of at least some of the processing instructions and/or the processing data may be referred to as a processor task. While the program statements within a processor task may be executed sequentially, different processor tasks may be executed in parallel on different processors in a multi-processor system. Thus, the software applications may be considered to contain processor tasks to be executed by the multi-processing system.

A design concern in a multi-processing system is how to manage which sub-processing units of the system execute which processor tasks. In some multi-processing systems, the processor tasks specify which of the sub-processing units are to perform the execution. A drawback to this approach is that the programmer may not have optimized the allocation of processor tasks among the sub-processing units. For example, one or more processor tasks may specify the same sub-processing unit at the same time. This dictates that some of the processor tasks be put on hold until the specified sub-processing unit becomes available, thereby delaying their execution. Unfortunately this also results in an unpredictable latency as to the execution of the processor tasks.

Other systems contemplate that a managing element communicates with the sub-processing units and schedules the processor tasks among them. A communication protocol must therefore be in place to facilitate such communication. Unfortunately communication protocols often result in message delays between the managing element and the sub-processing units. Indeed, such protocols may require the use of a memory mapped I/O space (using memory mapped registers), which are generally slow. Further, the managing elements (which may themselves be processors of the system) may employ multiple partition domains, which may require significant time to change (e.g., 700 us). These characteristics also delay execution of the processor tasks and result in unpredictable latencies. Thus, overall processor throughput and efficiency of the multi-processing system are sacrificed, which may result in significant impact on the real-time and/or multimedia experience of a user of the system.

Therefore, there are needs in the art for new methods and apparatus for achieving efficient multi-processing that reduces the adverse affects of hard processor errors.

SUMMARY OF THE INVENTION

In accordance with one or more aspects of the present invention, a method of managing processor tasks in a multi-processor computing system includes: storing the processor tasks in a shared memory that may be accessed by a plurality of sub-processing units of the multi-processor computing system; and permitting the sub-processing units to determine which of the processor tasks should be copied from the shared memory and executed based on priorities of the processor tasks.

In accordance with one or more further aspects of the present invention, a method of managing processor tasks in a multi-processor computing includes: storing the processor tasks in a shared memory that may be accessed by a plurality of sub-processing units of the multi-processor computing system; storing a task table in the shared memory, the task table including a task table entry associated with each of the processor tasks; linking at least some of the task table entries together to achieve at least one list of processor tasks to be invoked in hierarchical order; and permitting the sub-processing units to use the task table to determine which of the processor tasks should be copied from the shared memory and executed in accordance with the list of processor tasks.

Preferably, each of the task table entries includes at least one of: (i) an indication as to whether the associated processor task is ready to be executed by one or more of the sub-processing units; (ii) an indication as to a priority level of the associated processor task; (iii) a pointer to a previous task table entry in the list of task table entries (a previous pointer); and (iv) a pointer to a next task table entry in the list of task table entries (a next pointer).

The method may further include: storing a task queue in the shared memory, the task queue including at least one of a head pointer and a tail pointer, the head pointer providing an indication of a first one of the processor tasks in the list, and the tail pointer providing an indication of a last one of the processor tasks in the list; and permitting the sub-processing units to use the task table and the task queue to determine which of the processor tasks should be copied from the shared memory and executed in accordance with the list of processor tasks.

Preferably, the method further includes: linking respective groups of the task table entries together to produce respective lists of processor tasks, each list being in hierarchical order; and providing that the task queue includes respective task queue entries, each entry including at least one of a head pointer and a tail pointer for each of the lists of processor tasks. Preferably, each of the respective lists are associated with processor tasks of a common priority level; and the task queue includes a task queue entry for each of a plurality of priority levels of the processor tasks.

Preferably, the method further includes: copying the task queue and the task table from the shared memory into a local memory of a given one of the sub-processing units; searching the task queue for the head pointer to a given one of the processor tasks that is ready to be invoked; and copying the given processor task from the shared memory to the local memory of the given sub-processing unit for execution.

The step of searching the task queue preferably includes searching for the head pointer to a highest priority level one of the processor tasks that is ready to be invoked.

The method may further include removing the given processor task from the list. The removal step may include modifying the head pointer of the task queue to identify a new first processor task in the list that is ready to be invoked. Preferably, each of the task table entries includes a pointer to a next task table entry (a next pointer); and the step of modifying includes using the next pointer of the given task table entry to change the head pointer to identify the new first processor task as being ready to be next invoked. Preferably, each of the task table entries includes a pointer to a previous task table entry (a previous pointer); and the method further includes modifying the previous pointer of the last task table entry of the list to point to the task table entry associated with the new first processor task of the list.

In accordance with one or more further aspects of the present invention, a method of managing processor tasks in a multi-processor computing system, includes: storing the processor tasks in a shared memory that may be accessed by a plurality of sub-processing units of the multi-processor computing system; storing a task table in the shared memory, the task table including a task table entry associated with each of the processor tasks; linking at least some of the task table entries together to achieve at least one list of processor tasks in hierarchical order; at least initiating execution a first one of the processor tasks of the list within a given one of the sub-processing units, wherein the first one of the processor tasks yields the given sub-processing unit such that it is capable of executing another of the processor tasks; and determining which of the other processor tasks should be executed next within the given sub-processing unit by permitting the given sub-processing unit to use the task table to make such determination.

The method may further include: storing a task queue in the shared memory, the task queue including at least one of a head pointer and a tail pointer, the head pointer providing an indication of a new first one of the processor tasks in the list, and the tail pointer providing an indication of a last one of the processor tasks in the list; and permitting the sub-processing units to use the task table and the task queue to determine which of the processor tasks should be executed next.

Preferably, the step of determining includes: copying the task queue and the task table from the shared memory into a local memory of the given sub-processing unit; and searching the task queue for the head pointer to the new first processor task that is ready to be invoked. Preferably, the method further includes copying the new first processor task from the shared memory to the local memory of the given sub-processing unit for execution. The method may further include: thereafter copying the first processor task from the local memory of the given sub-processing unit back to the shared memory. Preferably, the step of determining is conducted prior to copying the first processor task from the local memory of the given sub-processing unit back to the shared memory. The step of determining may be initiated prior to completing execution of the first processor task by the given sub-processing unit. Preferably, the step of copying the first processor task from the local memory of the given sub-processing unit back to the shared memory is conducted prior to initiating execution of the new first processing task. The step of copying the first processor task from the local memory of the given sub-processing unit back to the shared memory may be conducted while at least a portion of the new first processing task is being executed by the given sub-processing unit.

The method preferably further includes: copying the first processor task from the local memory of the given sub-processing unit back to the shared memory. The method may further include: thereafter copying the new first processor task from the shared memory to the local memory of the given sub-processing unit for execution.

Preferably, the method further includes adding the first processor task back into the list. Preferably, each of the task table entries includes a pointer to a next task table entry (a next pointer) and pointer to a previous task table entry (a previous pointer); and the step of adding includes modifying the linking of the task table entries to include links to the task table entry associated with the first processor task.

The step of modifying the linking of the task table entries may include linking the task table entry associated with the first processor task between a prior task table entry and a following task table entry that were previously linked to one another.

Preferably, the method further includes: modifying the next pointer of the prior task table entry to point to the task table associated with the first processor task; modifying the previous pointer of the task table entry associated with the first processor task to point to the prior task table entry; modifying the next pointer of the task table entry associated with the first processor task to point to the following task table entry; and modifying the previous pointer of the following task table entry to point to the task table entry associated with the first processor task.

The step of modifying the linking of the task table entries may include linking the task table entry associated with the first processor task at a head of the link. Preferably, the step of modifying further includes removing the new first processor task from the list. The removal step may include modifying the head pointer of the task queue to point to the task table entry associated with the first processor task.

Preferably, the method further includes: replacing the next pointer of the task table entry associated with the first processor task with the next pointer of the task table entry associated with the new first processor task; and modifying the previous pointer of the task table entry identified by the next pointer of the task table entry associated with the new first processor task to point to the task table entry associated with the first processor task. The method may also include modifying the previous pointer of a last task table entry of the link to point to the task table entry associated with the first processor task.

In accordance with one or more further aspects of the present invention, a multi-processor apparatus includes: a plurality of sub-processing units, each sub-processing unit including a local memory in which to execute processor tasks; and a shared memory operable to store processor tasks that are ready to be executed, wherein the sub-processing units are operable to determine which of the processor tasks should be copied from the shared memory and executed based on priorities of the processor tasks.

In accordance with one or more further aspects of the present invention, a multi-processor apparatus includes: a plurality of sub-processing units, each sub-processing unit including a local memory in which to execute processor tasks; and a shared memory operable to store: (i) processor tasks that are ready to be executed, and (ii) a task table including a task table entry associated with each of the processor tasks, wherein the sub-processing units are operable to use the task table to determine which of the processor tasks should be copied from the shared memory into their local memories and executed.

In accordance with one or more further aspects of the present invention, a multi-processor apparatus includes: a plurality of sub-processing units, each sub-processing unit including a local memory in which to execute processor tasks; and a shared memory operable to store: (i) processor tasks that are ready to be executed, and (ii) a task table including a task table entry associated with each of the processor tasks, wherein: the sub-processing units are operable to at least initiate execution a first processor task and yield such that it is capable of executing another of the processor tasks, and the sub-processing units are operable to determine which of the other processor tasks should be executed next based on the task table.

In accordance with one or more further aspects of the present invention, the sub-processing units of the apparatus may be operable to perform the method steps also discussed above.

Other aspects, features, and advantages of the present invention will be apparent to one skilled in the art from the description herein taken in conjunction with the accompanying drawings.

DESCRIPTION OF THE DRAWINGS

For the purposes of illustration, there are forms shown in the drawings that are presently preferred, it being understood, however, that the invention is not limited to the precise arrangements and instrumentalities shown.

FIG. 5 is an illustration of an example of a processor task table that may be used in accordance with one or more aspects of the present invention;

FIG. 7 is an illustration of an example of a task queue that may be used in conjunction with the task table of FIG. 5 to manage the execution of processor tasks;

FIG. 20 is a block diagram illustrating non-preemptive processor task migration features of certain aspects of the present invention;

FIG. 23 is a block diagram illustrating preemptive multi-tasking features of certain aspects of the present invention;

FIG. 25 is a block diagram illustrating preemptive processor task migration features of certain aspects of the present invention;

FIG. 26 is a block diagram illustrating further preemptive processor task migration features of certain aspects of the present invention;

DETAILED DESCRIPTION OF THE PREFERRED EMBODIMENTS

Figure 1:
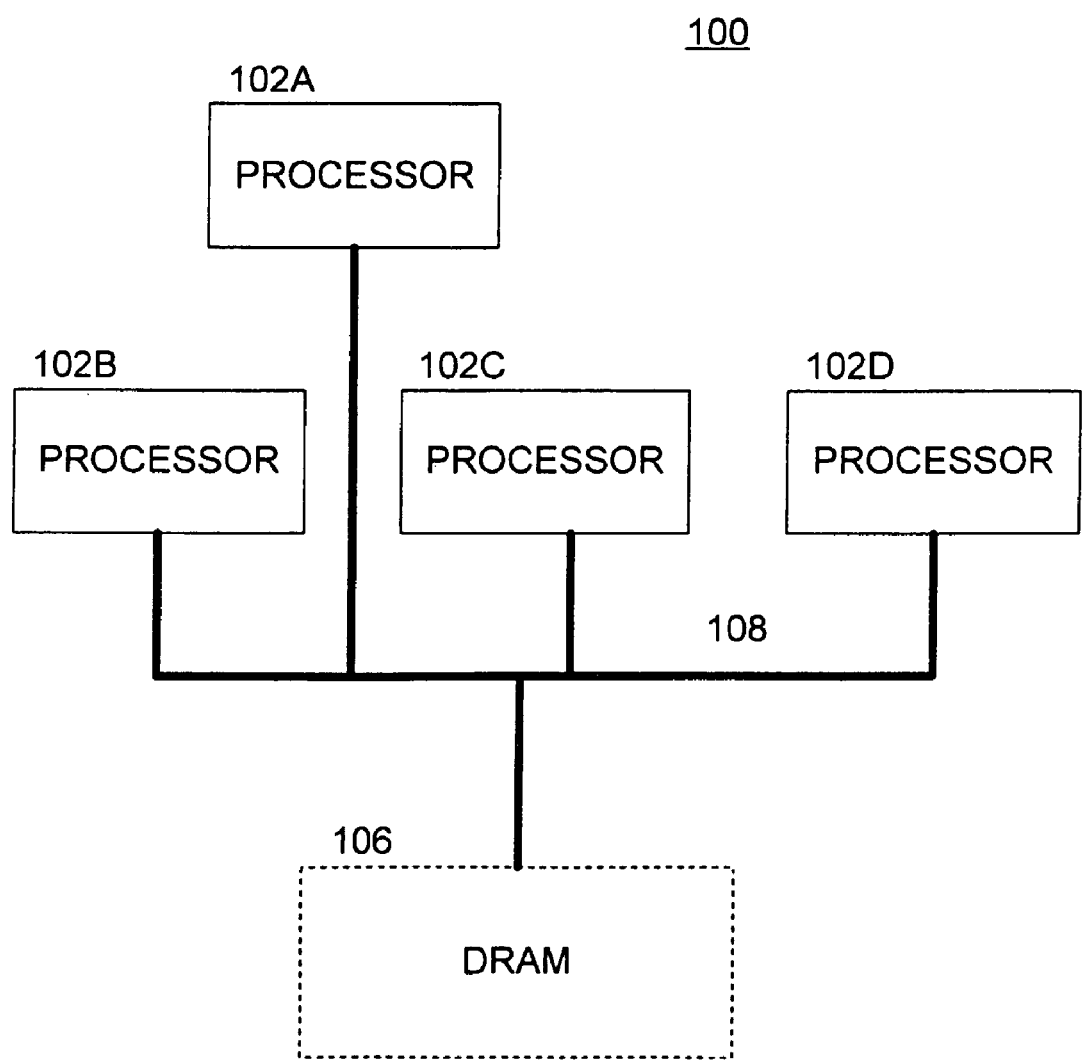
FIG. 1 is a diagram illustrating the structure of a multi-processing system in accordance with one or more aspects of the present invention.

With reference to the drawings, where like numerals indicate like elements, there is shown in FIG. 1 a multi-processing system 100 in accordance with one or more aspects of the present invention. The multi-processing system 100 includes a plurality of processors 102 (any number may be used) coupled to a shared memory 106, such as a DRAM, over a bus 108. It is noted that the shared memory 106 need not be a DRAM; indeed, it may be formed using any known or hereinafter developed technology.

One of the processors 102 is preferably a main processing unit, for example, processing unit 102A. The other processing units 102 are preferably sub-processing units (SPUs), such as processing units 102B, 102C, 102D, etc. The sub-processing units 102 may be implemented using any of the known or hereinafter developed computer architectures. All of the sub-processing units 102 need not be implemented using the same architecture; indeed they may be of heterogeneous or homogenous configurations. It is noted that the main processing unit 102A may be disposed locally with respect to the sub-processing units 102B-D, such as in the same chip, in the same package, on the same circuit board, in the same product, etc. Alternatively, the main processing unit 102A may be remotely located from the sub-processing units 102B-D, such as in different products, which may be coupled over a bus, a communications network (such as the Internet) or the like. Similarly, the sub-processing units 102B-D may be locally or remotely located from one another.

The main processing unit 102A may be used to schedule and orchestrate the processing of data and applications by the sub-processing units 102B-D such that the sub-processing units 102B-D perform the processing of these data and applications in a parallel and independent manner. In accordance with some aspects of the present invention, however, the main processing unit 102A does not take a central role in scheduling the execution of processor tasks among the sub-processing units. Rather, such scheduling is preferably left to the SPUs themselves.

The assignment of roles and functions to the processors 102 in FIG. 1 is flexible. For example, any of the processors 102 can be a main processor unit or a sub-processing unit.

Figure 2:
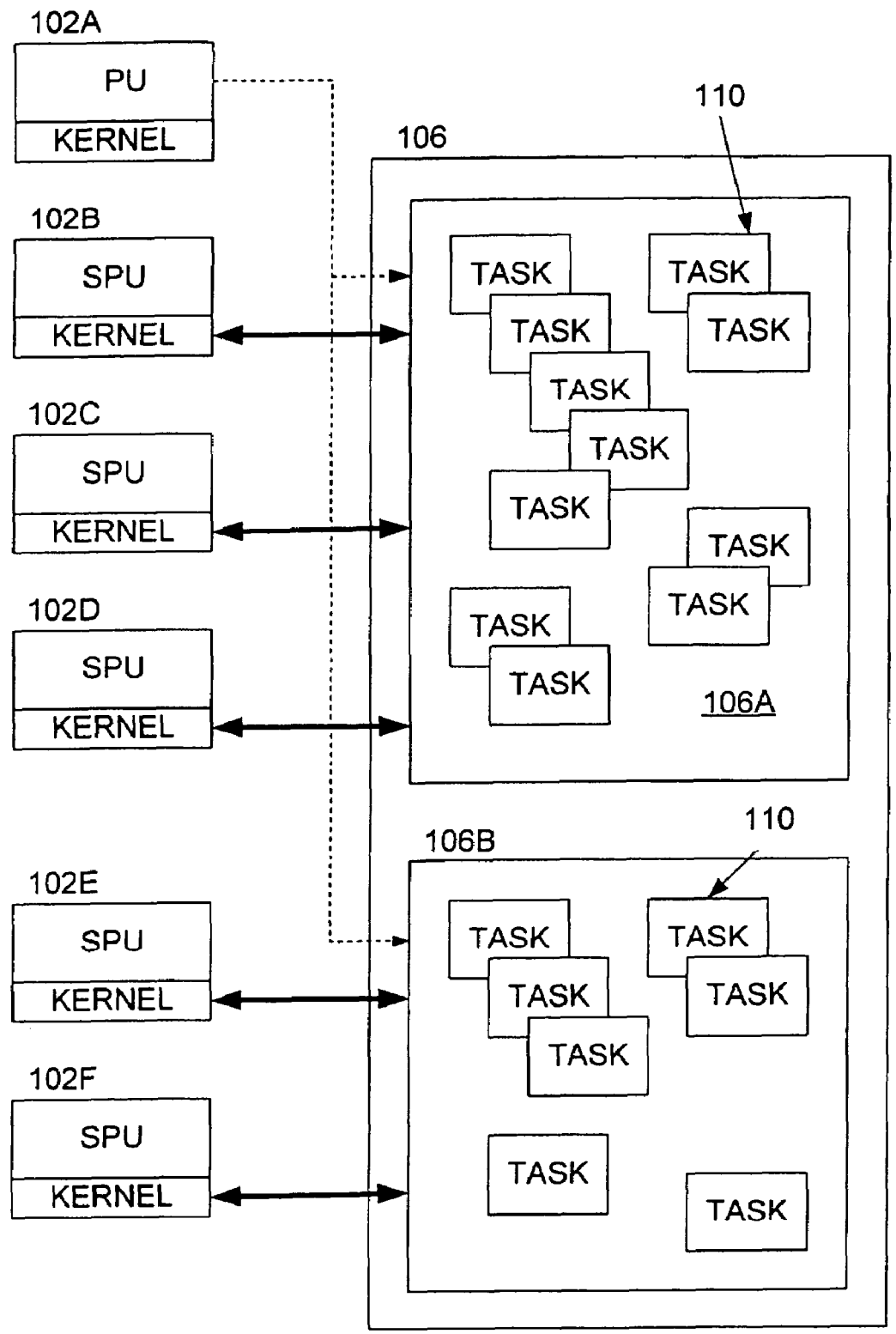
FIG. 2 is a block diagram illustrating the storage of processor tasks in a shared memory.

With reference to FIG. 2, the main processing unit 102A preferably assumes the role of a service processor to the SPUs 102B-F, particularly when it comes to the scheduling and management of the processor tasks among the SPUs. In accordance with some aspects of the present invention, the main processing unit 102A may evaluate the processor tasks that are contained within a software application and take part in the allocation of the shared memory 106, the allocation of the SPUs, and the initial storage of the processor tasks 110 within the shared memory 106. As to the allocation of the shared memory 106, the main processing unit 102A preferably determines how much of the memory space should be allocated to a given number of processor tasks 110. In this regard, the main processing unit 102A may allocate a first area 106A of the shared memory 106 for storage of some processor tasks 110, and may allocate a second area 106B of the shared memory 106 for storage of other processor tasks 110. The main processing unit 102A may also establish rules as to data synchronization within the respective areas 106A and 106B of the shared memory 106.

In accordance with one or more further aspects of the invention, the respective areas 106A and 106B of the shared memory 106 can only be accessed by a prescribed number of sub-processing units 102, such as the sub-processing units 102 that are allocated to perform the particular processor tasks 110 that are stored within a given area of the shared memory 106. For example, sub-processing units 102B-D are preferably the only SPUs that are permitted to access the processor tasks 110 within the first area 106A of the shared memory 106. Likewise, the sub-processing units 102E-F are preferably the only SPUs that are permitted to access the processor tasks 110 within the second area 106B of the shared memory 106. Further details concerning the techniques of protecting the respective areas 106A and 106B of the shared memory 106 may be found in U.S. Pat. No. 6,526,491, entitled MEMORY PROTECTION SYSTEM AND METHOD FOR COMPUTER ARCHITECTURE FOR BROADBAND NETWORKS, the entire disclosure of which is hereby incorporated by reference.

In accordance with one or more further aspects of the present invention, once the processor tasks 110 are disposed within the shared memory 106 and the sub-processing units 102 are allocated to execute the tasks, the main processing unit 102A preferably does not participate in the scheduling and management of the execution of the processor tasks 110. Instead those responsibilities are left to the particular sub-processing units 102 involved.

Prior to discussing further details regarding the processor task management features of the various embodiments of the present invention, a description of a preferred computer architecture for implementing a multi-processor system will be discussed. In this regard, reference is now made to FIG. 3, which is a block diagram of a basic processing module or processor element (PE) 200. In accordance with this computer architecture, all sub-processors of a multi-processing computer system are constructed from a common computing module (or cell). This common computing module has a consistent structure and preferably employs the same instruction set architecture. In alternative embodiments of the present invention, the sub-processing units may be of heterogeneous configurations. The multi-processing computer system can be formed of one or more clients, servers, PCs, mobile computers, game machines, PDAs, set top boxes, appliances, digital televisions and other devices using computer processors.

Figure 3:
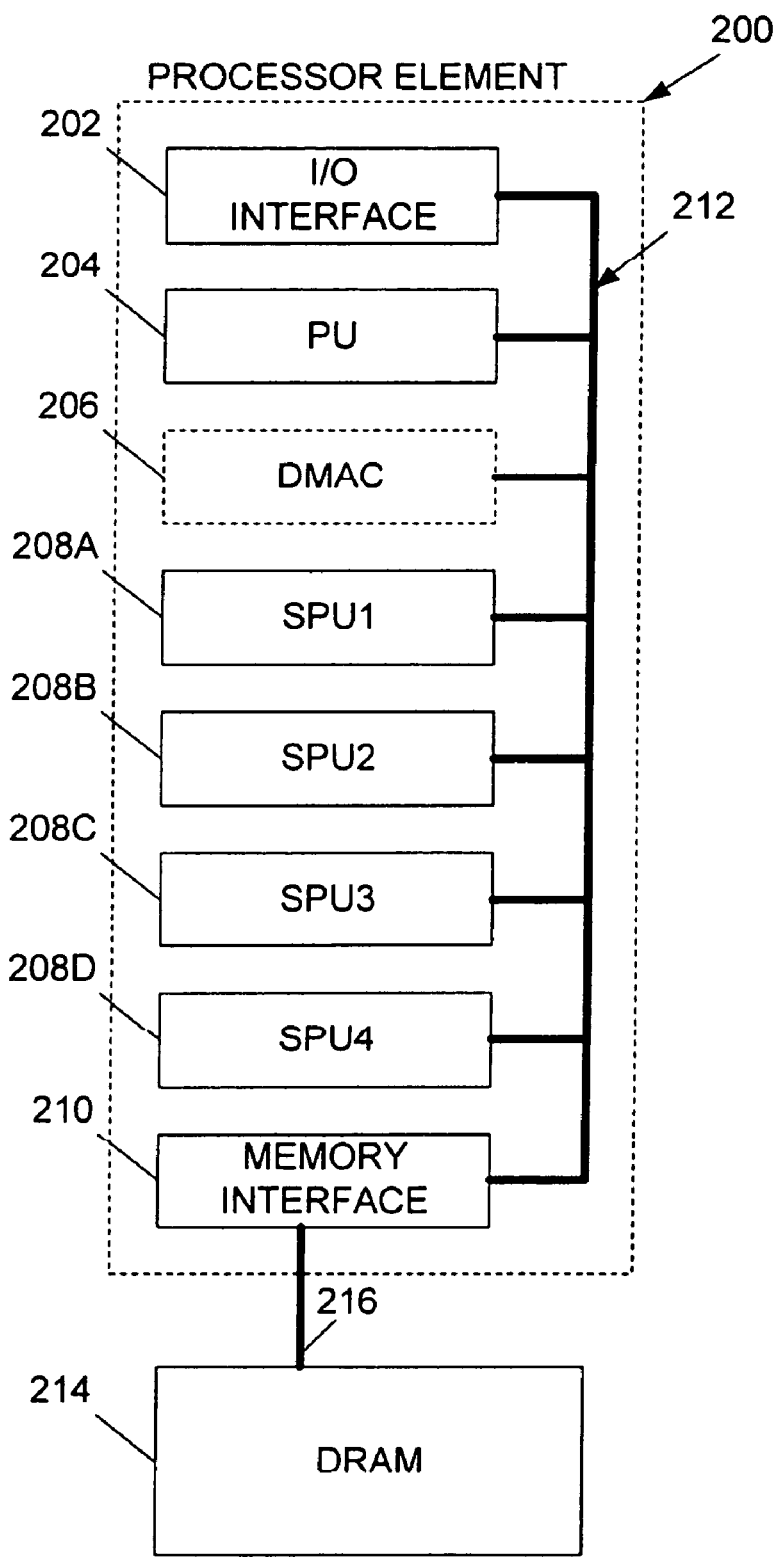
FIG. 3 is a diagram illustrating a preferred structure of a processor element (PE) in accordance with the present invention.

The basic processing module is a processor element (PE). As shown in FIG. 3, the PE 200 comprises an I/O interface 202, a processing unit (PU) 204, a direct memory access controller (DMAC) 206, and a plurality of sub-processing units 208, namely, sub-processing unit 208A, sub-processing unit 208B, sub-processing unit 208C, and sub-processing unit 208D. A local (or internal) PE bus 212 transmits data and applications among the PU 204, the sub-processing units 208, the DMAC 206, and a memory interface 210. The local PE bus 212 can have, e.g., a conventional architecture or can be implemented as a packet switch network. Implementation as a packet switch network, while requiring more hardware, increases available bandwidth.

The PE 200 can be constructed using various methods for implementing digital logic. The PE 200 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 200 also could be implemented using superconducting material, e.g., rapid single-flux-quantum (RSFQ) logic.

The PE 200 is closely associated with a dynamic random access memory (DRAM) 214 through a high bandwidth memory connection 216. The DRAM 214 functions as the main (or shared) memory for the PE 200. Although the DRAM 214 preferably is a dynamic random access memory, the DRAM 214 could be implemented using other means, e.g., as a static random access memory (SRAM), a magnetic random access memory (MRAM), an optical memory, a holographic memory, etc. The DMAC 206 and the memory interface 210 facilitate the transfer of data between the DRAM 214 and the sub-processing units 208 and the PU 204 of the PE 200. It is noted that the DMAC 206 and/or the memory interface 210 may be integrally or separately disposed with respect to the sub-processing units 208 and the PU 204. Indeed, instead of a separate configuration as shown, the DMAC 206 function and/or the memory interface 210 function may be integral with one or more (preferably all) of the sub-processing units 208 and the PU 204.

The PU 204 can be, e.g., a standard processor capable of stand-alone processing of data and applications. The sub-processing units 208 preferably are single instruction, multiple data (SIMD) processors. The sub-processing units 208 perform the processing of data and applications, preferably in a parallel and independent manner. The DMAC 206 controls accesses by the PU 204 and the sub-processing units 208 to the data and applications (e.g., the processor tasks 110) stored in the shared DRAM 214. It is noted that the PU 204 may be implemented by one of the sub-processing units 208 taking on the role of a main processing unit.

In accordance with this modular structure, the number of PEs 200 employed by a particular computer system is based upon the processing power required by that system. For example, a server may employ four PEs 200, a workstation may employ two PEs 200 and a PDA may employ one PE 200. The number of sub-processing units of a PE 200 assigned to processing a particular software cell depends upon the complexity and magnitude of the programs and data within the cell.

Figure 4:
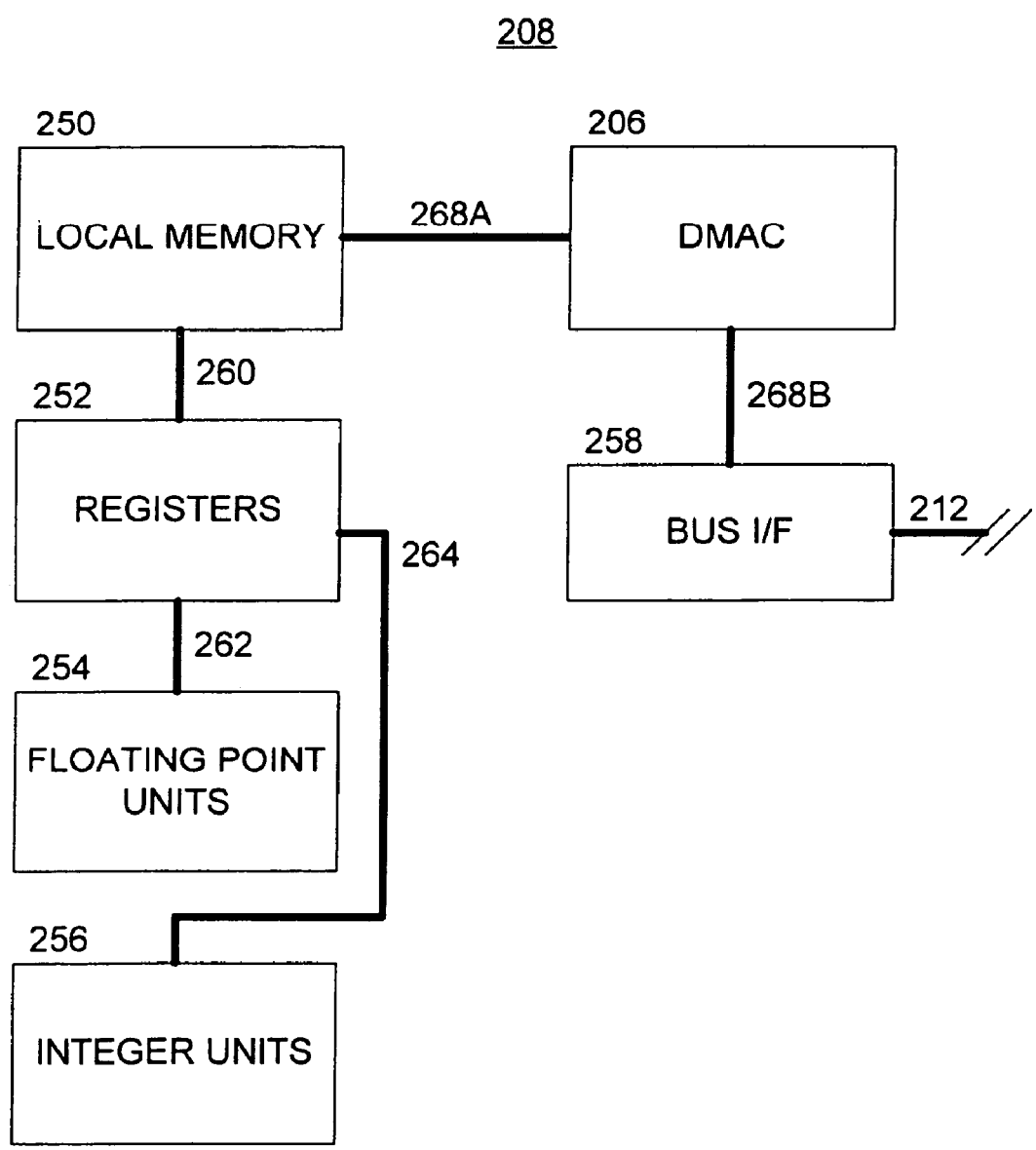
FIG. 4 is a diagram illustrating the structure of an exemplary sub-processing unit (SPU) in accordance with the present invention.

FIG. 4 illustrates the preferred structure and function of a sub-processing unit 208. The sub-processing unit 208 includes local memory 250, registers 252, one or more floating point units 254 and one or more integer units 256. Again, however, depending upon the processing power required, a greater or lesser number of floating points units 254 and integer units 256 may be employed. The floating point units 254 preferably operate at a speed of 32 billion floating point operations per second (32 GFLOPS), and the integer units 256 preferably operate at a speed of 32 billion operations per second (32 GOPS).

In a preferred embodiment, the local memory 250 contains 256 kilobytes of storage, and the capacity of registers 252 is 128×128 bits. It is noted that the processor tasks 110 are not executed using the shared memory 214. Rather, the tasks 110 are copied into the local memory 250 of a given sub-processing unit 208 and executed locally.

The local memory 250 may or may not be a cache memory. The local memory 250 is preferably constructed as a static random access memory (SRAM). A PU 204 may require cache coherency support for direct memory accesses initiated by the PU 204. Cache coherency support is not required, however, for direct memory accesses initiated by the sub-processing units 208 or for accesses from and to external devices.

The sub-processing unit 208 further includes a bus interface (I/F) 258 for transmitting applications and data to and from the sub-processing unit 208. In a preferred embodiment, the bus I/F 258 is coupled to a DMAC 206, which is shown in dashed line to indicate that it may be integrally disposed within the sub-processing unit 208 as shown or may be externally disposed (as shown in FIG. 3). A pair of busses 268A, 268B interconnect the DMAC 206 between the bus I/F 258 and the local memory 250. The busses 268A, 268B are preferably 256 bits wide.

The sub-processing unit 208 further includes internal busses 260, 262 and 264. In a preferred embodiment, the bus 260 has a width of 256 bits and provides communications between the local memory 250 and the registers 252. The busses 262 and 264 provide communications between, respectively, the registers 252 and the floating point units 254, and the registers 252 and the integer units 256. In a preferred embodiment, the width of the busses 264 and 262 from the registers 252 to the floating point or the integer units is 384 bits, and the width of the busses 264 and 262 from the floating point or the integer units 254, 256 to the registers 252 is 128 bits. The larger width of these busses from the registers 252 to the floating point or the integer units 254, 256 than from these units to the registers 252 accommodates the larger data flow from the registers 252 during processing. A maximum of three words are needed for each calculation. The result of each calculation, however, normally is only one word.

Turning again to the various processor tasks management features of the present invention, and with reference to FIG. 2, it is preferable that the sub-processing units 102 utilize a task table in order to determine which of the processor tasks 110 should be copied from the shared memory 106 and into one of the local memories of the SPUs 102 for execution. In this regard, reference is now made to FIG. 5, which is a conceptual illustration of a task table 280 that may be utilized in accordance with various aspects of the present invention. The task table 280 is preferably stored in the shared memory 106 (the details of how the task table 280 is initialized will be discussed later). The task table 280 preferably includes a plurality of task table entries T1, T2, T3, etc. Each task table entry is preferably associated with one of the processor tasks 110 (FIG. 2), for example, by way of associative addressing or some other means for relating the task table entries to the processor tasks 110.

In a preferred embodiment, each of the task table entries may include at least one of a status indication (STAT), a priority indication (PRI), and a pair of pointers (PREV, NEXT). The STAT preferably provides an indication as to whether the processor task associated with the given task table entry is READY to be executed by (or is RUNNING on) one or more of the sub-processing units. The PRI preferably provides an indication as to a priority level of the associated processor task 110. There may be any number of priority levels associated with the processor tasks 110, which may be established by the software programmer or may be later established through execution of the software application. In any event, the priority levels of the processor tasks 110 may be utilized to establish an order in which the processor tasks are executed. The PREV value is preferably a pointer to a previous task table entry (or to a previous processor task 110) in an ordered list of linked task table entries (or list of processor tasks). The NEXT value is preferably a pointer to a NEXT task table entry (or processor task) in the ordered list of linked task table entries (or processor tasks).

In accordance with one or more aspects of the present invention, the task table 280 is preferably utilized by the sub-processing unit 102 in order to determine an order in which the processor tasks 110 are copied from the shared memory 106 for execution. For example, in order to properly execute a software application on the multi-processing system 100 or 200, certain processor tasks 110 may need to be executed in a particular order, or at last in terms of a general order, say T1, T8, T6, and T9. In order to reflect this illustrative example of processor task ordering, the task table 280 preferably contains pointers in the respective PREV and NEXT portions of the task table entries that create a linked list of task table entries, and by extension processor tasks. In accordance with the particularities of the above example, the task table entry T1 includes a NEXT value that points to task table entry T8. Task table entry T8 includes a PREV value that points to task table entry T1, and contains a NEXT value that points to task table entry T6. Task table entry T6 includes a PREV value that points to task table entry T8, and a NEXT value that points to task table entry T9. Task table entry T9 includes a PREV value that points to task table entry T6.

Figure 6:
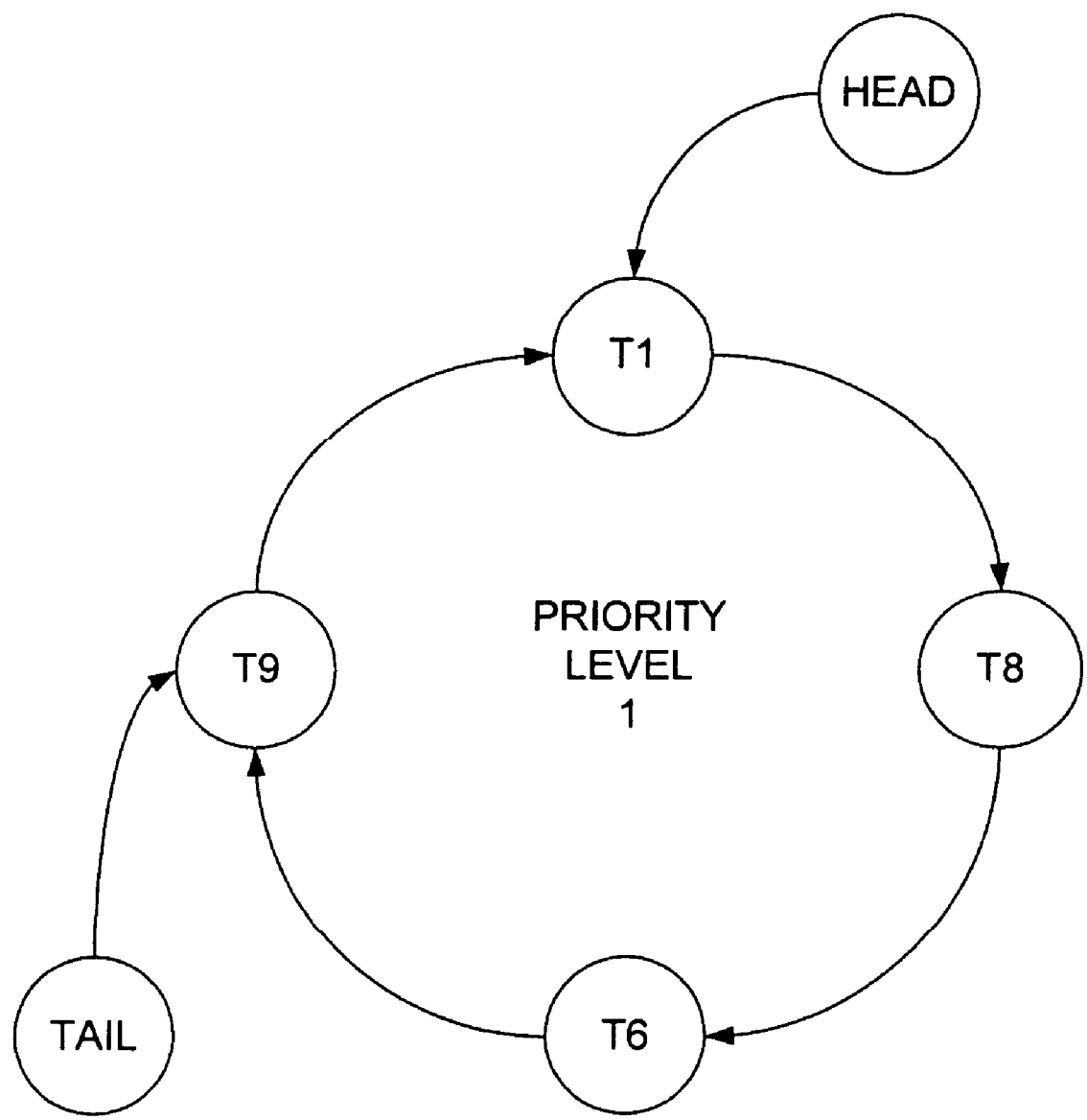
FIG. 6 is a state diagram of a linked list of processor tasks established by the task table of FIG. 5.

With reference to FIG. 6, the linked list of task table entries of the above example may be conceptually illustrated as a state diagram in which a transition from a particular processor task associated with task table entry T1 results in the selection and execution of another processor task that is associated with task table entry T8. A transition from the processor task associated with task table entry T8 results in the selection and execution of a processor task associated with task table entry T6, and so on. A circular association of the task table entries (and/or the processor tasks themselves) may be obtained by insuring that the first, or head, task table entry T1 includes a PREV value that points to task table entry T9, and that task table entry T9 includes a NEXT value that points to task table entry T1.

During operation, the respective sub-processing units 102 that are allocated to execute the pool of processor tasks 110 (preferably within a given area 106A or 106B) of the shared memory 106 first access the task table 280 to determine which processor task 110 should be taken up next for execution. In order to aid in the identification of the first (or head) entry of the linked list, the sub-processing units 102 preferably also have access to a task queue 282, which is conceptually illustrated in FIG. 7. The task queue 282 preferably includes an entry for each priority level of the associated processor tasks 110. Each entry preferably includes at least one of a HEAD pointer and a TAIL pointer.

With further reference to FIG. 6, the illustrated state diagram of the exemplary linked list is representative of processor tasks 110 having a priority level of 1. Indeed, each task table entry (FIG. 5) for entries T1, T8, T6, and T9 include PRI values of 1.

The HEAD pointer and TAIL pointer of the task queue entry associated with priority level 1 contain pointers to task table entry T1 and task table entry T9, respectively. The other entries of the task queue 282 are associated with the HEAD and TAIL pointers of other priority levels for other linked lists. In this manner, it is contemplated that various embodiments of the present invention may include multiple linked lists of task table entries (and by extension processor tasks), where each linked list contains entries of the same or a least similar priority levels. The respective sub-processing units 102 preferably utilize the task table 280 and the task queue 282 to determine which of the processor tasks 110 should be copied from the shared memory 106 for execution. Provided that the respective linked lists are created and maintained properly, the processor tasks 110 may be executed in the proper order in order to achieve desirable results in the execution of the overall software application.

Figure 8:
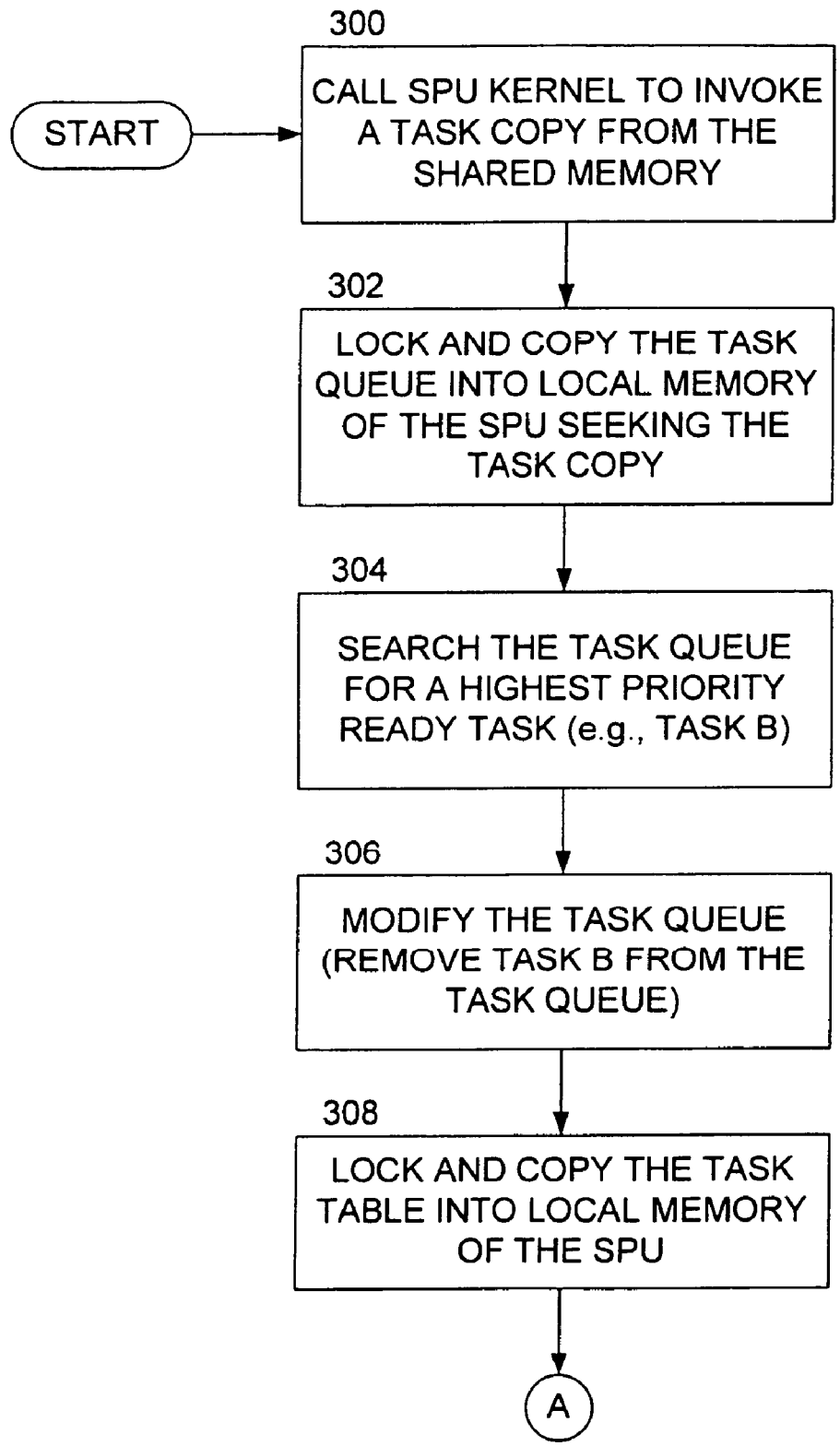
FIG. 8 is a flow diagram illustrating process steps that may be carried out by the multi-processing system in accordance with one or more aspects of the present invention.

In accordance with various aspects of the present invention, the sub-processing units 102 maintain and modify the task table 280 and the task queue 282 during execution of the software application. In this regard, reference is now made to FIGS. 8-10, which are flow diagrams illustrating a process flow that is suitable for achieving one or more desirable features of the present invention. At action 300, a particular sub-processing unit 102 is called to initiate the copying of a processor task 110 from the shared memory 106 to the local memory thereof. At action 302, the sub-processing unit 102 locks and copies the task queue 282 into its local memory. Thereafter, the task queue 282 is searched for a highest priority ready task (action 304). Using the example illustrated in FIG. 7, the task queue 282 includes a HEAD pointer that points to the task table entry T1, which is associated with a processor task of highest priority, such as priority level 1. Since the processor task associated with task table entry T1 is targeted for execution, the sub-processing unit 102 preferably modifies the task queue 282 to remove the reference to that processor task (action 306). In accordance with a preferred embodiment, this entails modification of the HEAD pointer to the TASK table entry T1 to another task table entry that will become a new first (or head) task table entry indicating the next processor task that should be taken up for execution. In particular, the NEXT pointer of the task table entry T1 may be used as the new HEAD pointer of priority level 1. Indeed, as illustrated in FIG. 6, once the processor task associated with task table entry T1 is being executed (or RUNNING) it is no longer in the READY state and should be removed from the state diagram. This should leave the task table entry T8 as the head entry of the state diagram. As task table entry T1 will no longer be part of the READY state diagram, the PREV pointer of the task table entry T8 may be modified to point to task table entry T9. Thus, at action 308 that task table is labeled and copied into the local memory of the SPU 102 such that it may be modified. Similarly, the NEXT pointer of the task table entry T9 may be modified to point to the task table entry T8.

Figure 9:
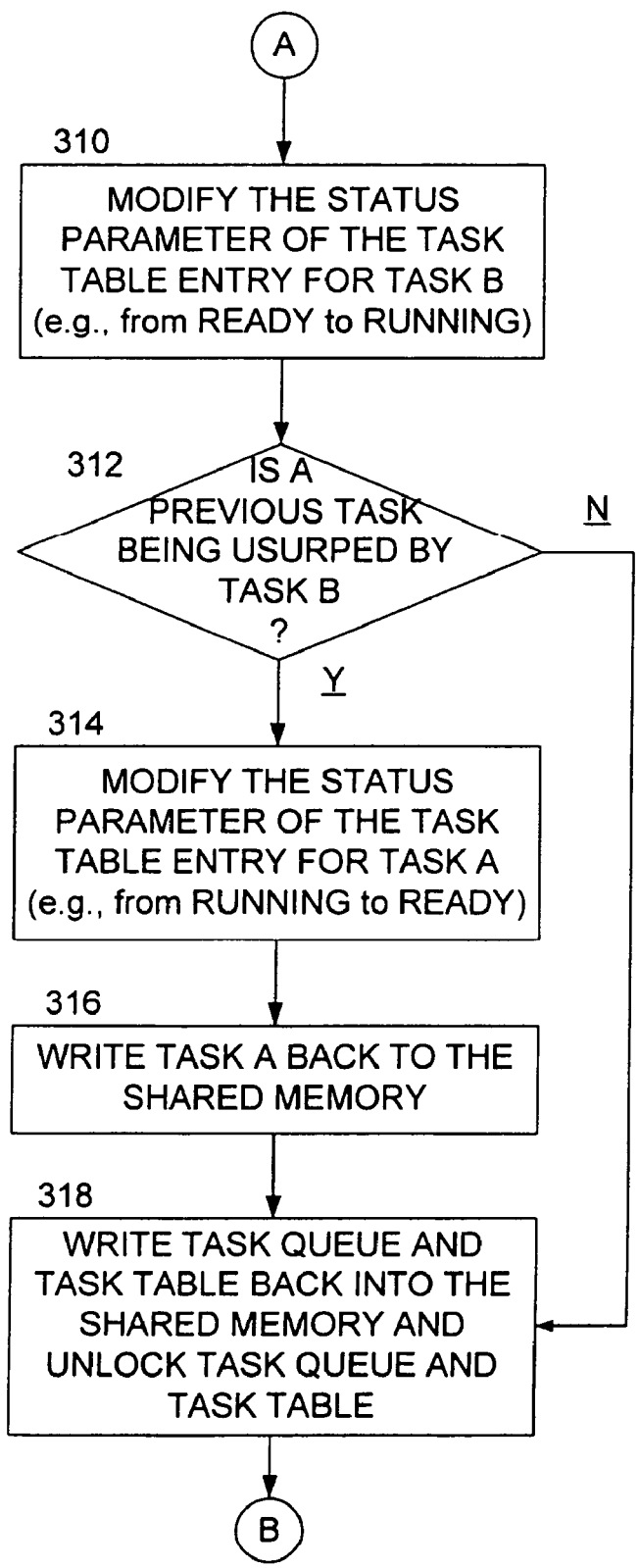
FIG. 9 is a flow diagram illustrating further process steps that may be carried out by the multi-processing system in accordance with the present invention.
Figure 10:
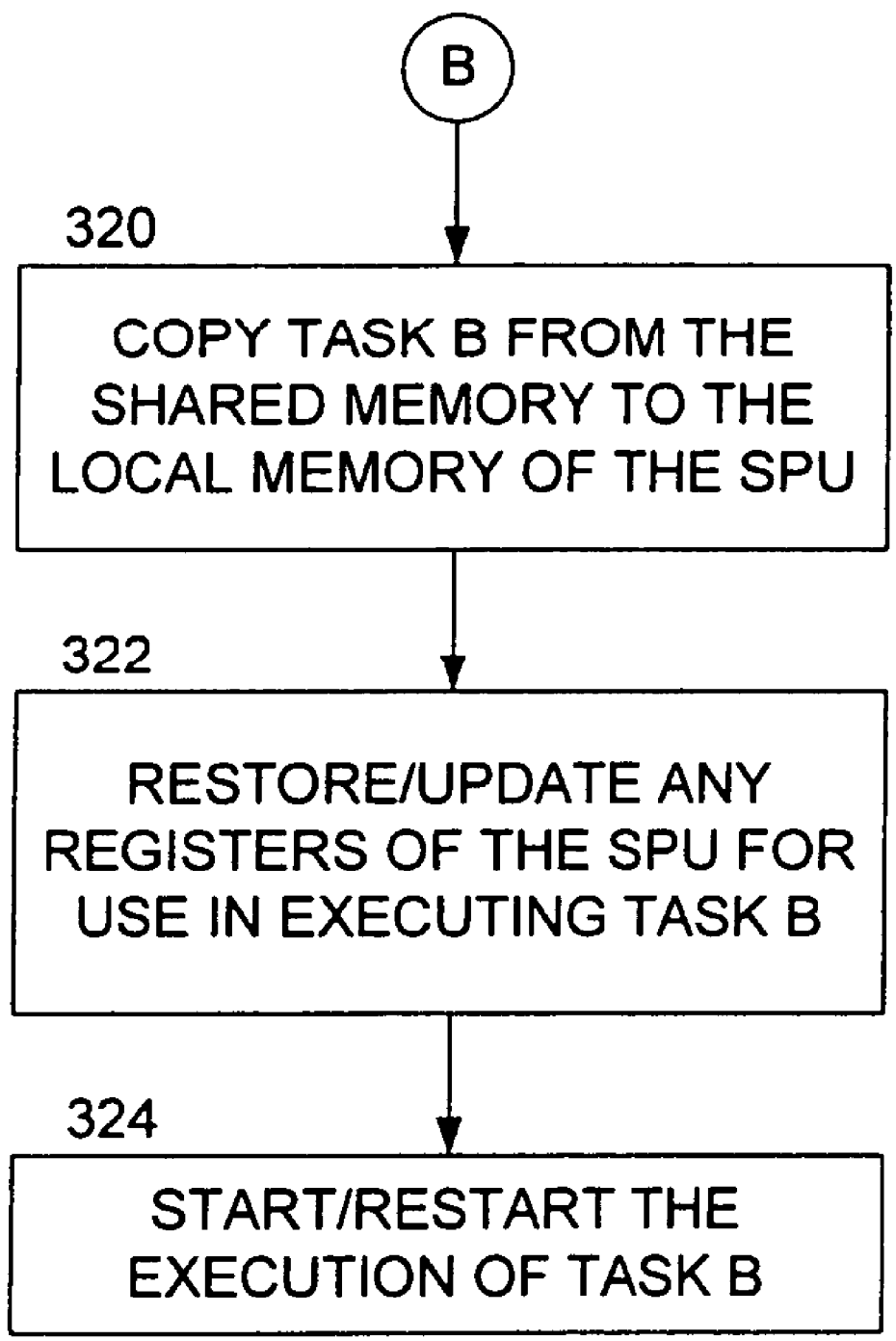
FIG. 10 is a flow diagram illustrating still further process steps that may be carried out by the multi-processing system in accordance with the present invention.

In accordance with preferable aspects of the present invention, the SPU 102 preferably modifies the STAT value of the task table entry T1 from READY to RUNNING (action 310, FIG. 9). As action 312, a determination is preferably made as to whether the SPU 102 was running a previous task at the time that it was called (action 300) to invoke a next task. This may occur when a previous task running on the SPU 102 yields to another task. For purposes of the present example, it is assumed that a previous task neither yielded to, nor was otherwise usurped by, the next processor task 110 and that the result of the determination at action 312 is in the negative. Accordingly, the process flow preferably advances to action 318, where the SPU 102 writes the modified task queue 282 and the modified task table 280 back into the shared memory 106. At this point, the task table 280 and the task queue 282 have been updated and, in accordance with preferred synchronization techniques, are unlocked such that they may be copied and modified by other sub-processing units 102.

If the result of the determination at action 312 is in the affirmative, such as would be the case if a previous processor task 110 yielded to the next processor task for execution, the process flow preferably advances to action 314. There, the SPU preferably modifies the STAT value of the task table entry associated with the yielding processor task from RUNNING to READY. Further, the SPU may then modify the PREV and NEXT pointers of various task table entries (including the task table entry associated with the yielding processor task) in order to reintroduce the yielding processor task back into the appropriate linked list. Preferably, this is accomplished by referencing the priority level of the yielding processor task 110 as reflected in the PRI value of the associated task table entry. At action 316, the yielding processor task may be written back into the shared memory 106 such that it may be taken up at a later time. Thereafter, the process flow advances to action 318, where the task queue 282 and the task table 280 are written back into the shared memory 106.

At action 320 (FIG. 10), the next processor task 110 (e.g., the processor task associated with task table entry T8) is copied by the sub-processing unit 102 from the shared memory 106 to the local memory thereof. At action 322, the sub-processing unit 120 preferably restores and/or updates registers thereof (e.g., with any data associated with the new processor task) for use in executing the new processor task 110. Finally, at action 324, the new processor task 110 is executed by the sub-processing unit 102.

It is noted that the above sequence of actions is presented by way of example only and it should be understood by those skilled in the art that the sequence of these actions may be modified without departing from the spirit and scope of the present invention. For example, as will be discussed later in this description, the order in which the processor tasks are copied from and written back into the shared memory 106 and the order in which the task table and task queue 282 are utilized, may be modified in order to achieve desirable results.

Figure 11:
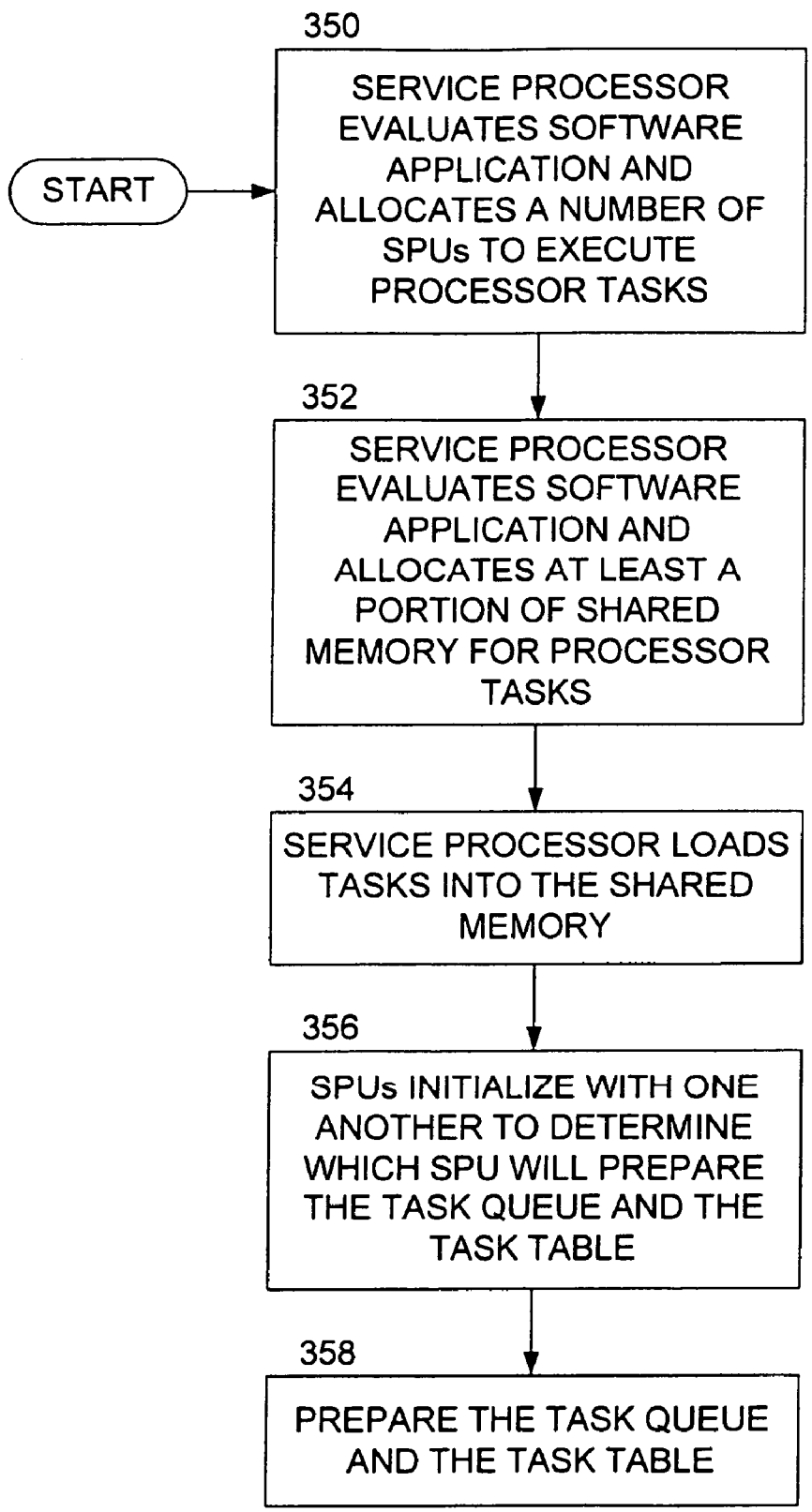
FIG. 11 is a flow diagram illustrating process steps for initializing the processor tasks in the shared memory and that may be carried out by the multi-processing system in accordance with various aspects of the present invention.

As discussed above, the main processing unit 102A is preferably utilized during an initialization phase of the system in order to place the system in a state in which the execution and management of the processor tasks 110 may be handled by the sub-processing units 102. The sub-processing units 102 also preferably conduct an initialization routine in order to create the task table 280 and the task queue 282 in the first instance. These initialization processes are illustrated in the flow diagram of FIG. 11.

At action 350, the service processor (e.g., the main processing unit 102) evaluates the software application to be executed on the system and allocates a number of the sub-processing units 102 to execute the processor tasks 110. The process flow preferably advances to action 352 where the service processor evaluates the software application and allocates one or more portions of the shared memory 106 to receive the processor tasks 110. At action 354, the processor tasks 110 are loaded into the shared memory 106 in accordance with any memory allocation that was performed at action 352. At this stage of the initialization process, the service processor is preferably no longer involved in the maintenance and/or allocation of the processor tasks among the sub-processing units 102.

The process flow preferably advances to action 356, where the sub-processing units 102 initialize with one another to determine which SPU is to prepare the task table 280 and the task queue 282 in the first instance. At action 358, the sub-processing unit 102 that was charged to create the task table 280 and the task queue 282 prepares such information and stores same in the shared memory 106. By way of example, the initialization of the task table 280 and task queue 282 is preferably performed by having each SPU kernel execute an initial task. The program, init.c, reproduced below, is a preferred example of the initial task performed by each SPU:

```
#include <spurs.h>
#include "task_instance.h"
int
main( )
{
  spurs_beggin_init( );
  if (spurs_get_spu_id( ) == 0) {
    spurs_create_task(melchior);
    spurs_create_task(balthasar);
    spurs_create_task(caspar);
    spurs_start_task(melchior);
    spurs_start_task(balthasar);
    spurs_start_task(caspar);
  }
  spurs_end_init( );
  return 0;
}
```

In this program, 'melchior', 'balthasar' and 'caspar' are the names of the very beginning tasks, which are typical start up tasks. All of the SPU kernels execute this initial task, init.c, but only one SPU—the SPU with ID0—executes these tasks, as specified by the line of code: if(spurs_get_spu_id ( )==Ø). All the other SPUs, e.g., those with a different ID, wait at spurs_end_init( ). Thus, each of the SPU kernel executes the initial task and after this initial task finishes, the SPU kernels just start looking for next task as described herein.

It is noted that the main processing unit 102, acting as a service processor as discussed above, may designate one or more of the processor tasks 110 as being within a group. This is preferably performed during the initialization stage. For example, two or more processor tasks 110 may need to tightly communicate with one another and, therefore, may be executed more efficiently if they are grouped together in a task group. An encryption program is an example of an application that may contain processor tasks that communicate tightly and would be more efficiently executed if they were formed into one or more task groups.

The processor task management features of the present invention may be utilized to assist the main processing unit 102A to off-load a device driver to a particular sub-processing unit 102 or group of sub-processing units 102. By way of example, a network interface, such as a gigabit Ethernet handler, may utilize up to 80% of CPU power. If the network interface is executed solely by the main processing unit 102A, then the main processing unit 102A may not be available to do other service-oriented processing tasks. Accordingly, it may be beneficial for a main processing unit 102A to off-load the network interface program to one or more of the sub-processing units 102. The main processing unit 102A may achieve this result by placing the processing tasks of the network interface into the shared memory 106 and allocating one or more sub-processing units 102 to execute same. In response, the SPUs may form a task table 280 and a task queue 282 suitable for managing and scheduling the execution of such processor tasks. Advantageously, the main processing unit 102A may therefore devote more CPU power to executing other tasks. The main processing unit 102A may also off-load other device drivers, such as a digital television device driver. Other device drivers that are good candidates for off-loading to SPUs are those that have heavy protocol stacks. For example, drivers for real-time high speed access devices, such as for a HDD recorder, can be advantageously off-loaded. Other examples of tasks that can be off-loaded include network packet encryption/description tasks used for Virtual Private Networks and multimedia over IP (e.g. VoIP) applications.

Figure 12:
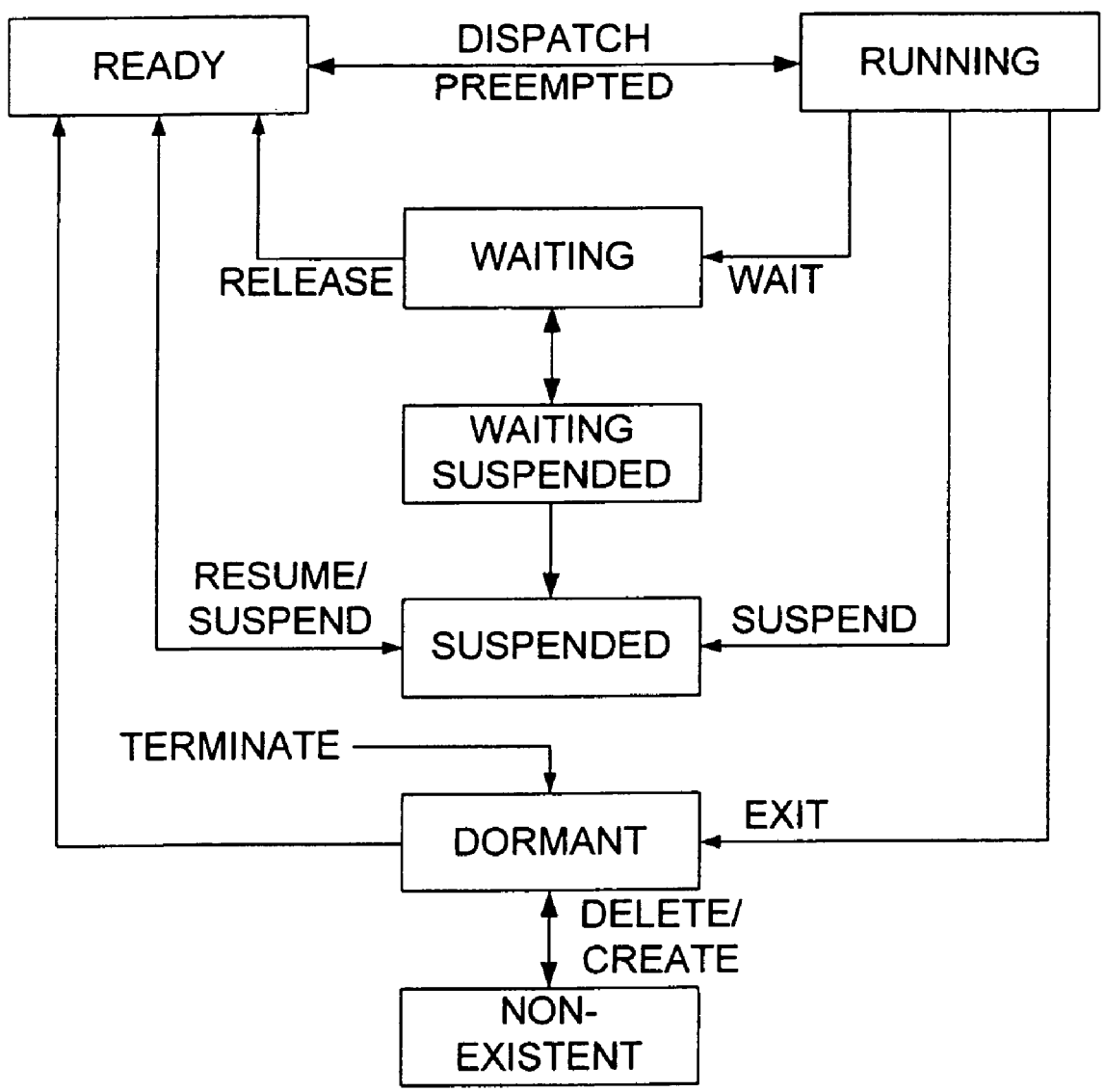
FIG. 12 is a state diagram illustrating the different status states of the processor tasks in accordance with one or more aspects of the present invention.

Reference is now made to FIG. 12, which is an example of a state diagram of the status of the processor tasks. The task states may be classified into five categories: the RUNNING state, the READY state, the BLOCKED state, the DORMANT state, and the NON-EXISTENT state. A processor task is in the RUNNING state when it is currently executing. Under some circumstances, a processor task may remain in the RUNNING state even in non-task contexts, such as during interrupts. A processor task is in the READY state when the task is ready to be executed, but cannot be executed because one or more processor tasks with higher precedence are already being executed and a sub-processing unit is not available to take up the task. Once the priority level of the READY processor task is high enough among the pool of READY tasks in the shared memory 106, a sub-processing unit may take up the processor task and execute same. Thus, the state of a processor task may change from the READY state to the RUNNING state when the task is dispatched. Conversely, the task state of a RUNNING task may change to the READY state if such task is preempted or otherwise usurped during its execution. An example of the preemption of a processor task was discussed hereinabove in connection with one processor task yielding to another.

The BLOCKED state category may include the WAITING state, the SUSPENDED state, and the WAITING-SUSPENDED state. A processor task is in the WAITING state when the execution of such task is blocked due to the invocation of a service call specifying that certain conditions must be met before execution of the task continues. Thus, the state of a RUNNING task may change to the WAITING state upon the invocation of a service call. A processor task in the WAITING state may be released into the READY state when the specified conditions are met, thereby enabling the processing task to be taken up by a sub-processing unit 102 thereafter. A processor task may enter the SUSPENDED state from the RUNNING state when the task is forcibly halted (which the task itself may invoke). Similarly, a processor task in the READY may enter the SUSPENDED state through forced action. A SUSPENDED processor task may be resumed and enter the READY state when the forcible halting of such processor task is released. A processor task is in the WAITING-SUSPENDED state when the task is both waiting for a condition to be met and when it has been forcibly suspended. Thus, a WAITING-SUSPENDED processor task may enter the WAITING state when the forcible suspension of the PROCESSOR task, where the processor task will wait for the condition to be satisfied.

A processor task is in the DORMANT state when the task has not been executed or has already finished its execution. A DORMANT processor task may enter the READY state under appropriate circumstances. The NON-EXISTENT state is a so-called virtual state where the task does not exist in the system, for example, because it has not yet been created or because it has already been deleted.

If a task that has been moved to the READY state has a higher precedence (or priority) than a task in the RUNNING state, the lower precedence task is preferably moved to the READY state and the higher priority task is preferably dispatched and moved to the RUNNING state. In this circumstance, the lower priority task has been preempted by the higher priority task.

Non-preemptive, priority-based task scheduling is conducted based on the priorities assigned to the processor tasks. If there are a number of processor tasks with the same priority, scheduling is conducted on a first-come, first-served (FCFS) basis. This task scheduling rule may be defined using a precedence between tasks based on task priorities. If a runable task exists, at most the same number of high precedence tasks as allocated sub-processing units 102 will be in the RUNNING state. The remainder of the runable tasks will be in the READY state. Among the tasks with different priorities, the task with the highest priority has higher precedence. Among tasks of the same priority, the processor task that entered the runable (running or ready) state earliest has the higher precedence. However, the precedence between tasks of the same priority may change do to the invocation of some service calls. When a processor task is given precedence over other processor tasks, it is preferred that a dispatch occurs immediately and that the task is moved into the RUNNING state.

Figure 13:
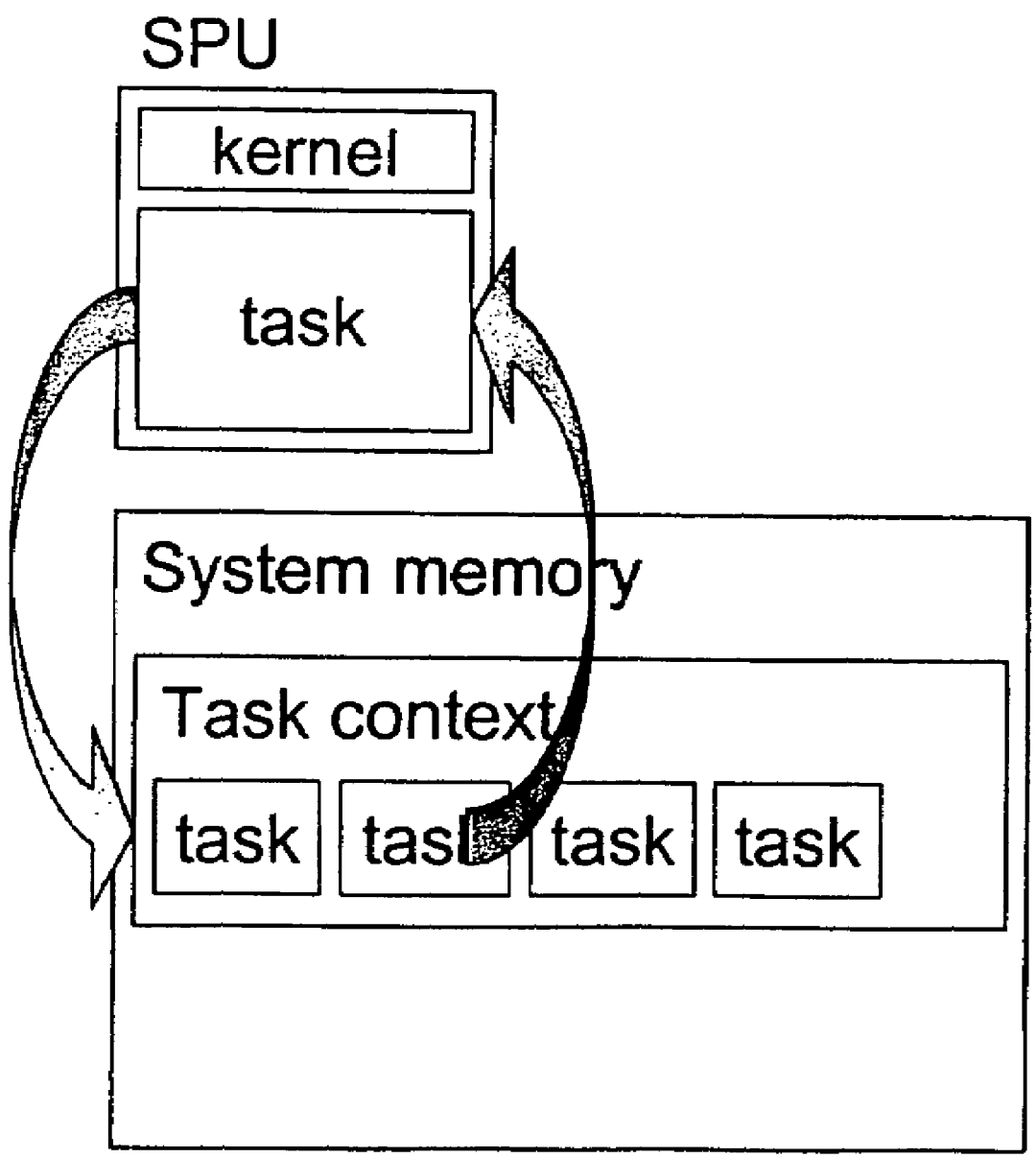
FIG. 13 is a block diagram illustrating how processor tasks may be copied from and written back to the shared memory in accordance with one or more aspects of the present invention.
Figure 14:
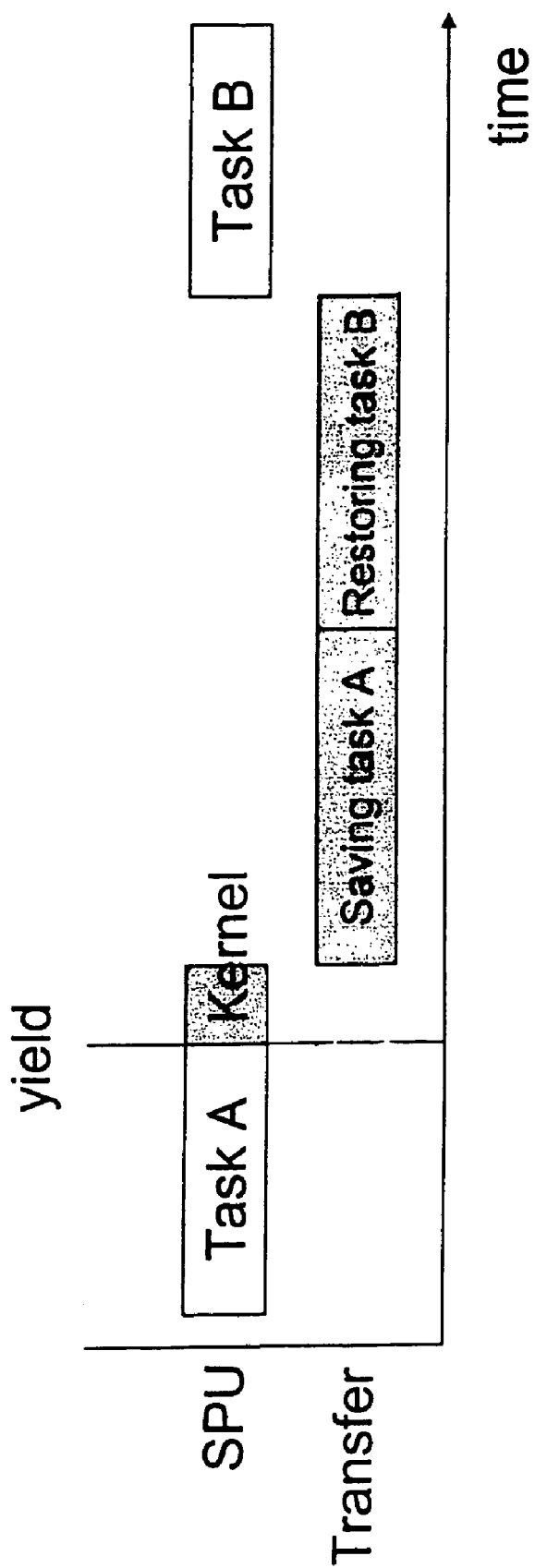
FIG. 14 is a timing diagram illustrating the processing latency associated with the copy and write back technique of FIG. 13.

Reference is now made to FIGS. 13-14, which illustrate certain preemption features in accordance with certain aspects of the present invention. As discussed above, a processor task in the RUNNING state (e.g., task A) may be preempted or otherwise yield to another processor task in the READY state (e.g., task B). As illustrated in FIGS. 13 and 14, task A is being executed on the sub-processing unit 102 up to the point of the yield. At that point, the kernel of the SPU operates to copy task A back to the shared memory 106 (saving task A). Thereafter, task B is copied from the shared memory 106 to the local memory of the SPU (restoring task B). The SPU then executes task B. While this technique enjoys relatively high performance with reference to the amount of local memory utilization and high bandwidth, there is task execution latency from the point of the yield to the execution of task B that is not optimized.

Figure 15:
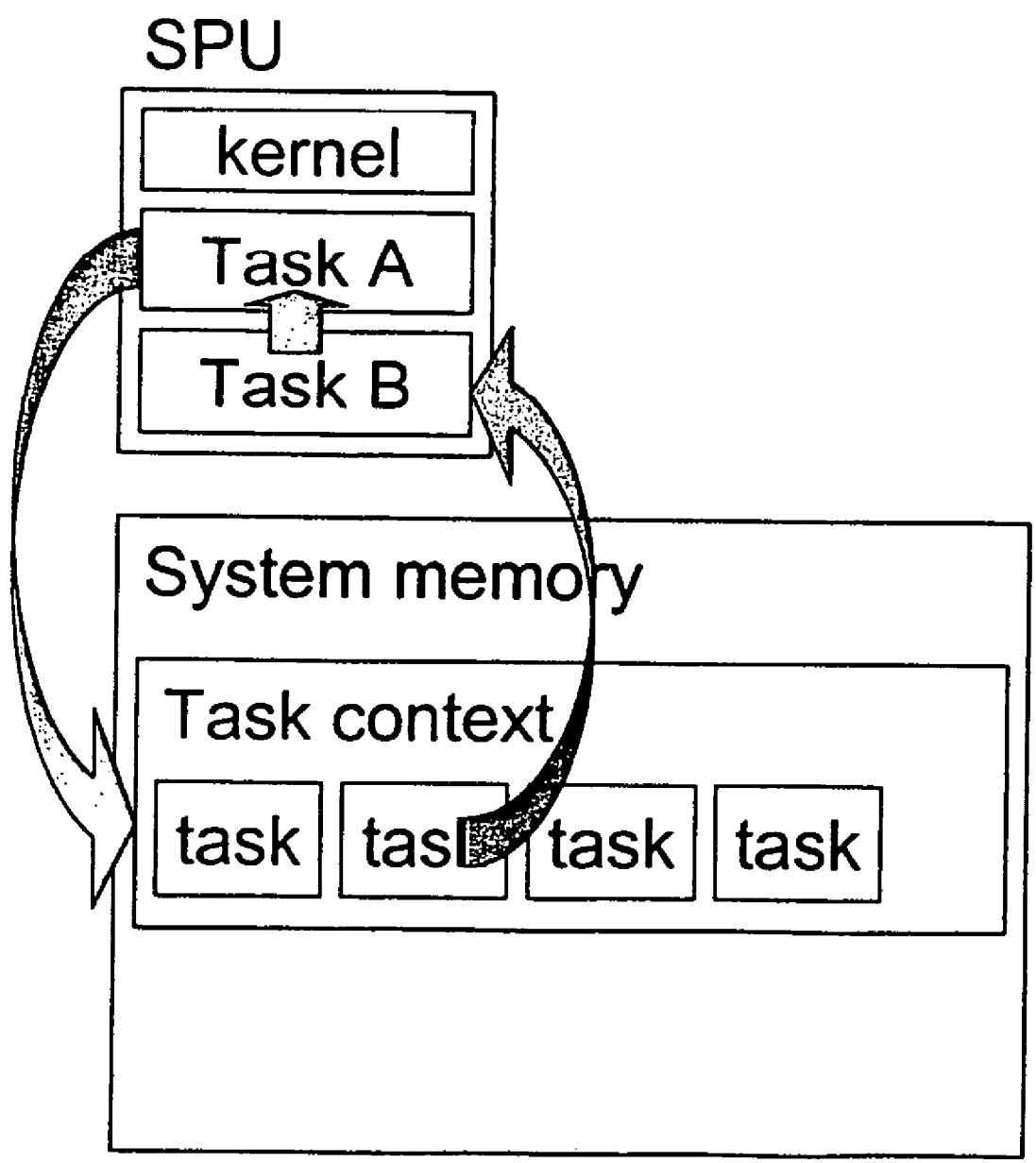
FIG. 15 is a block diagram illustrating how processor tasks may be copied from and written back to the shared memory in accordance with one or more further aspects of the present invention.
Figure 16:
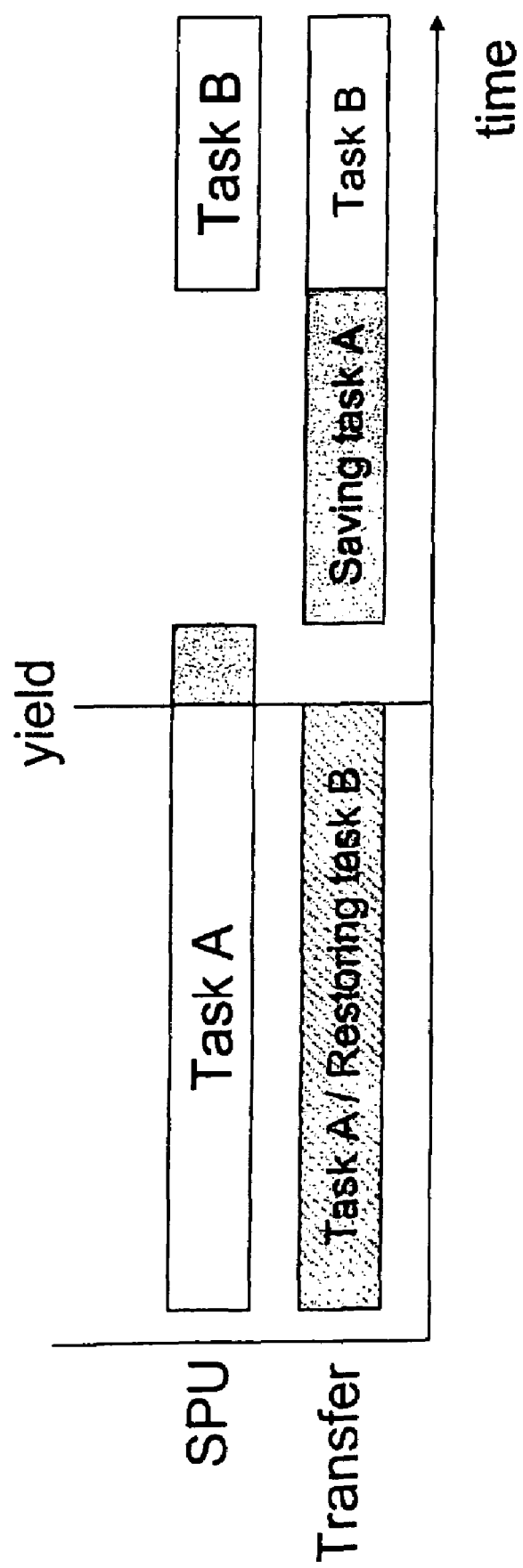
FIG. 16 is a timing diagram illustrating the processing latency associated with the copy and write back technique of FIG. 15.

With reference to FIGS. 15-16, an alternative approach is illustrated in accordance with further aspects of the present invention. In this scenario, task B may be copied from the shared memory 106 to the local memory of the sub-processing unit 102 prior to copying task A from the local memory to the shared memory 106. In this regard, the sub-processing unit 102 may execute task A, while at the same time taking steps to identify and retrieve task B from the shared memory 106. This may entail copying the task table 280 and the task queue 282 from the shared memory 106 to the local memory of the sub-processing unit 102A and using same to identify the next READY task, i.e., task B. At the yield point, the kernel of the sub-processing unit 102A copies task A from the local memory to the shared memory 106, which may entail modifying the task table 280 and the task queue 282 as described hereinabove. Thereafter, the sub-processing unit 102 may take up the execution of task B. This technique significantly reduces the latency between the yield and the execution of task B as compared with the technique illustrated in FIGS. 13-14.

Figure 17:
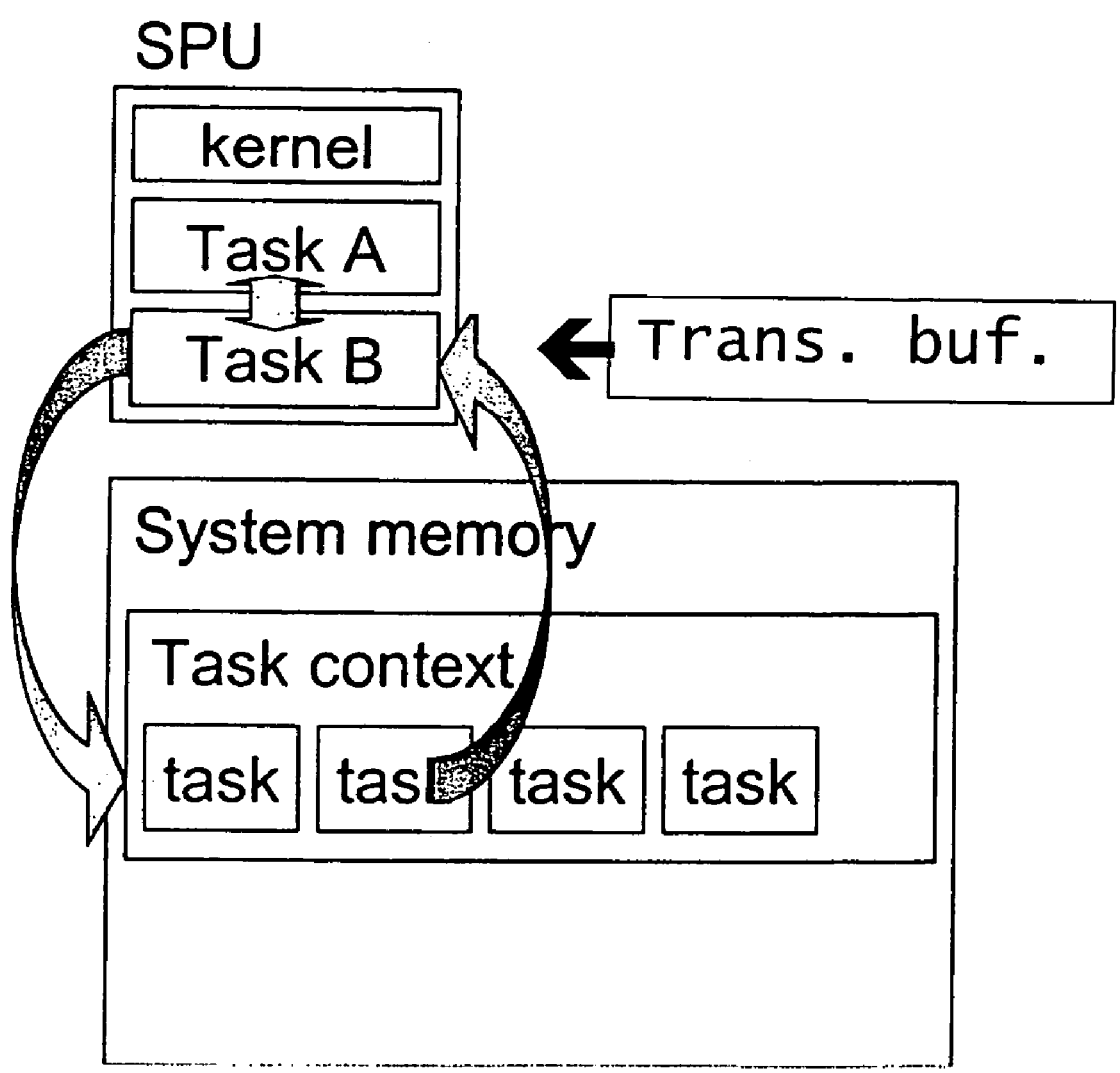
FIG. 17 is a block diagram illustrating how processor tasks may be copied from and written back to the shared memory in accordance with one or more still further aspects of the present invention.
Figure 18:
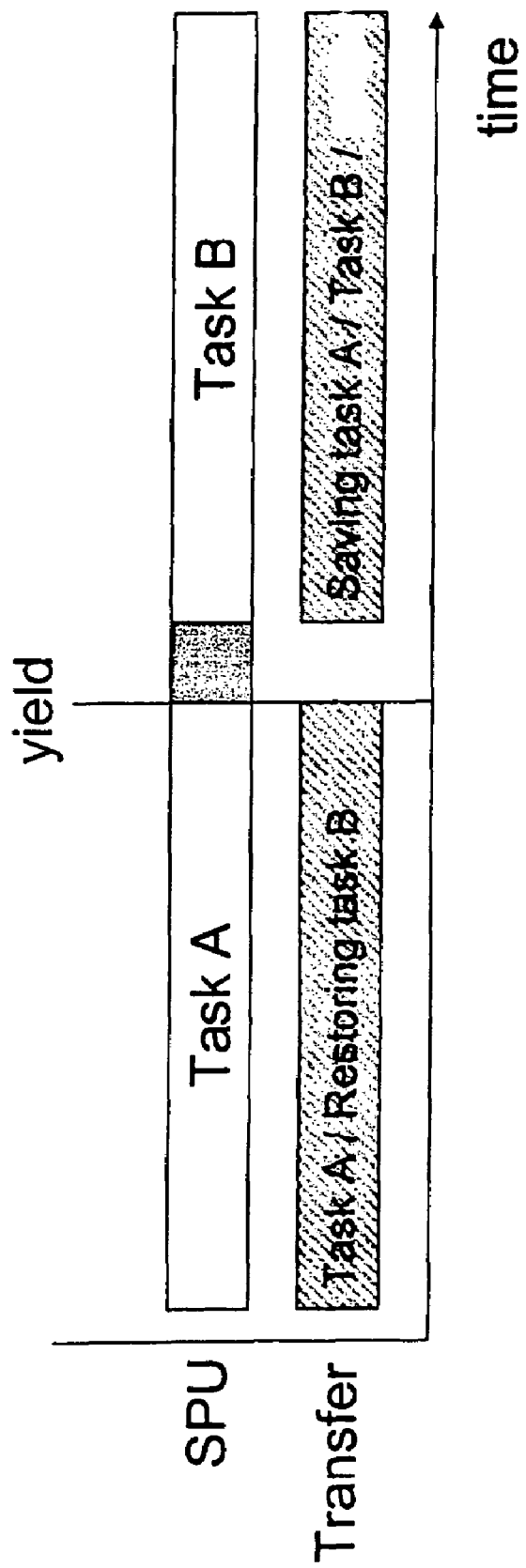
FIG. 18 is a timing diagram illustrating the processing latency associated with the copy and write back technique of FIG. 17.

With reference to FIGS. 17 and 18, the latency between the yield and the execution of task B may be further reduced in accordance with one or more further aspects of the present invention. In particular, the sub-processing unit 102 may operate in a substantially similar way as discussed hereinabove with respect to FIGS. 15 and 16 up to the point of the yield. After the yield, however, the sub-processing unit 102 preferably initiates the execution of task B. At substantially the same time, the kernel of the sub-processing unit 102 preferably operates to copy task A from the local memory of the sub-processing unit 102 to the shared memory 106. Since task B is executed very shortly after the yield, the latency is significantly reduced as compared with the approaches illustrated in FIGS. 14-16.

Figure 19:
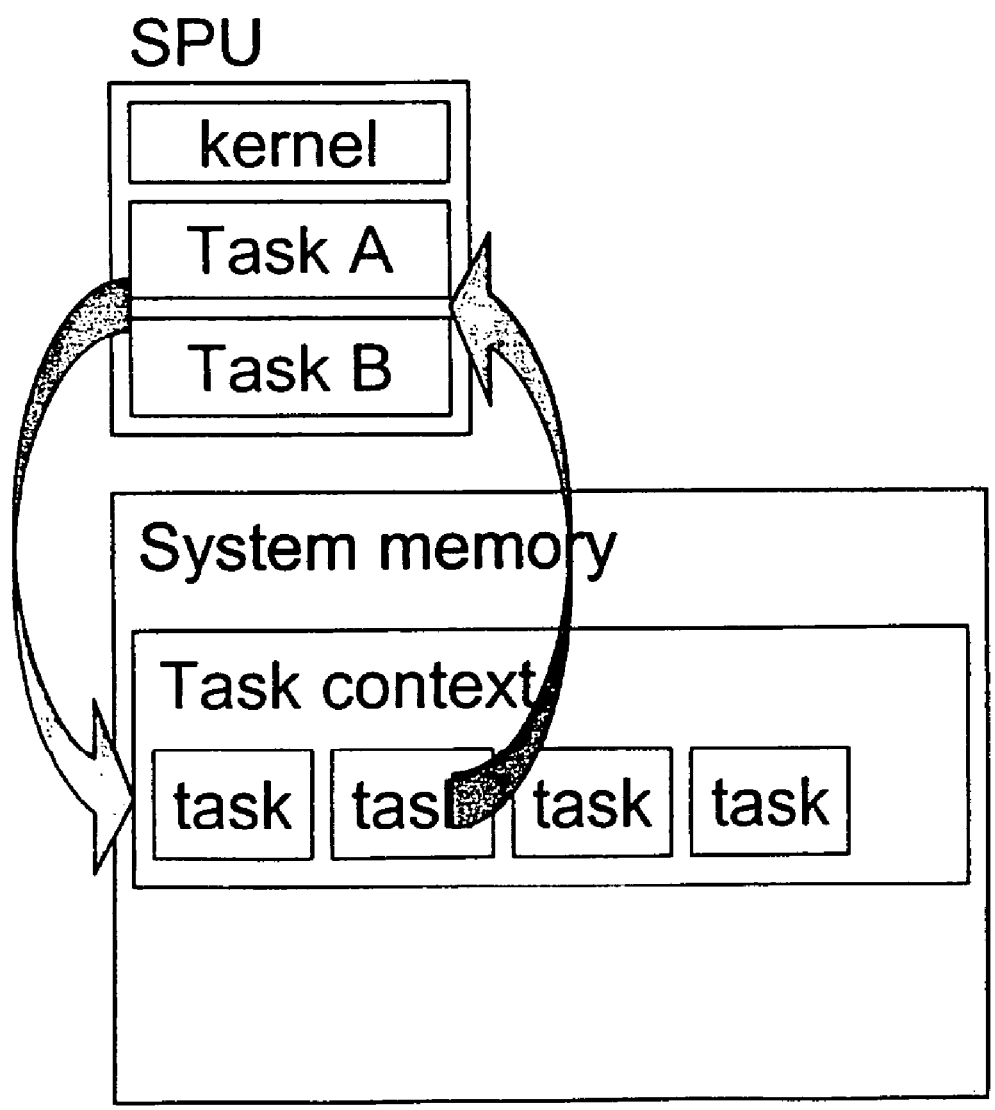
FIG. 19 is a block diagram illustrating how processor tasks may be copied from and written back to the shared memory in accordance with one or more still further aspects of the present invention.

In accordance with one or more further aspects of the present invention, the sub-processing units 102 may maintain multiple processor tasks in the local memory for execution. This is illustrated in FIG. 19. The local memory includes a plurality of pages and a page table in order to manage the execution of multiple processor tasks. The advantage of this approach is that latencies may be further reduced, although one drawback is that significantly more space within the local memory will be monopolized by process task execution.

Figure 21:
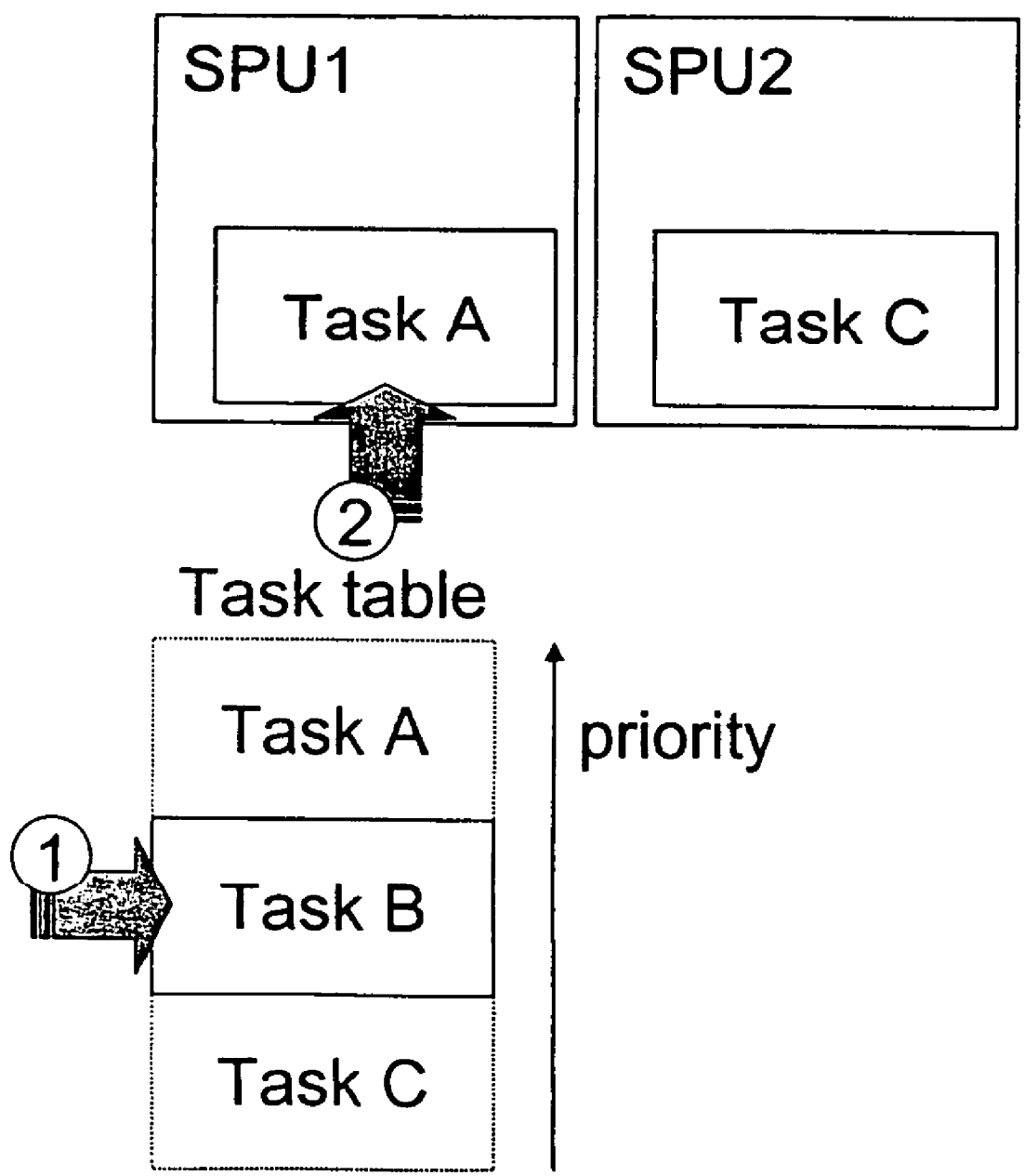
FIG. 21 is a block diagram illustrating further non-preemptive processor task migration features of certain aspects of the present invention.
Figure 22:
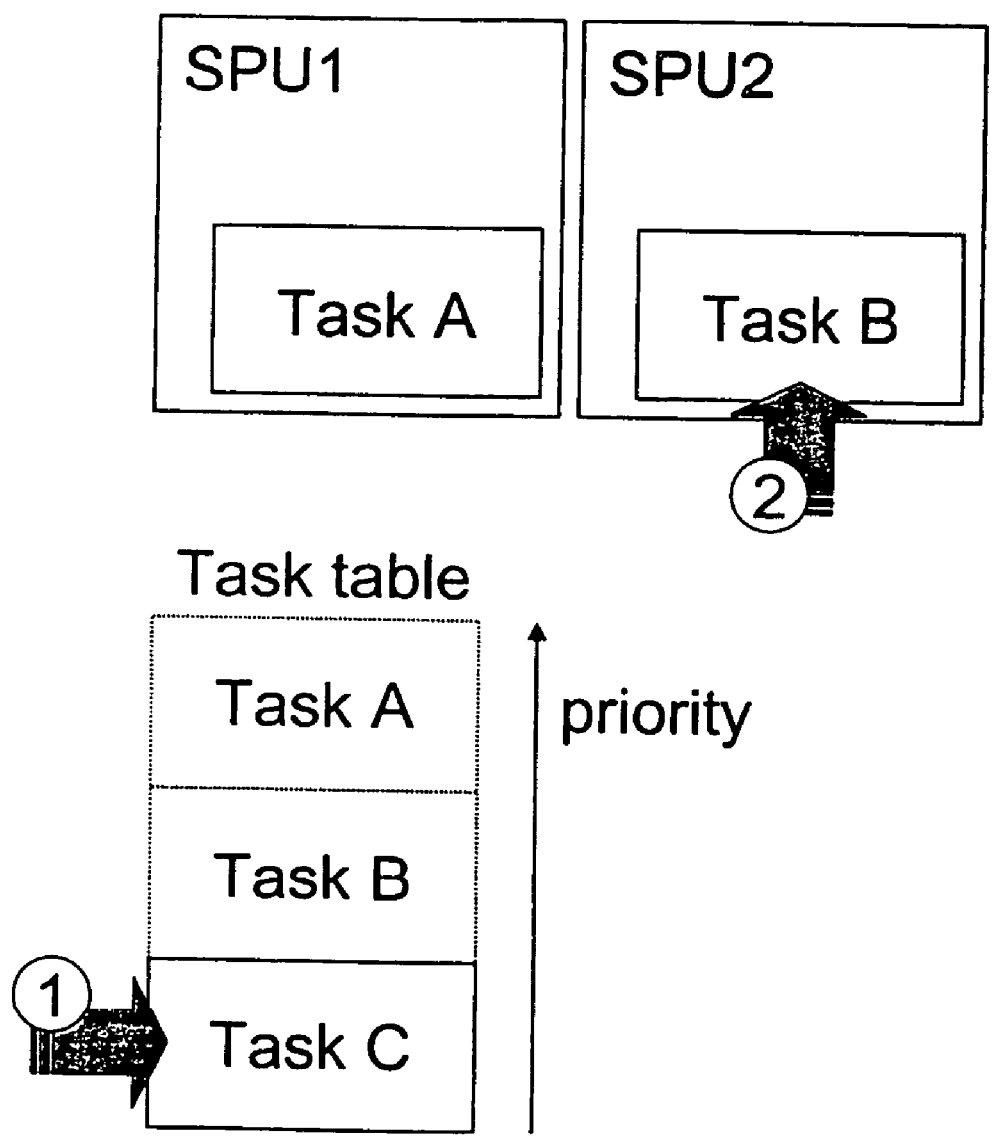
FIG. 22 is a block diagram illustrating still further non-preemptive processor task migration features of certain aspects of the present invention.

Reference is now made to FIGS. 20-22, which illustrate processor task migration in accordance with one or more aspects of the present invention. These figures illustrate how a processor task, for example, task B may be migrated from one sub-processing unit SPU1 to another sub-processing unit SPU2. The migration may be based on some condition, such as respective priority levels associated with the respective processor tasks. In accordance with some aspects of the invention, the migration of the processor task from one sub-processing unit to another may not be preemptive. In other words, the migration of the processor task may naturally flow as a result of priority conditions and timing, but are not based on some decision to cause the migration.

This non-preemptive migration may be illustrated by the following example. Assume that processor task B was selected from the shared memory 106 utilizing the task table, which dictates a priority order for the processor tasks that are ready to be executed. Task B is running on sub-processing unit SPU1. Similarly, it is assumed that processor task C was selected from the shared memory 106 in accordance with the task table and is running on sub-processing unit SPU2. At the time that processor task B and processor task C were selected, it is assumed that processor task A of a higher priority level was not ready to be executed and, therefore, was not selected for execution. While processor task B and processor task C are running, however, it is assumed that processor task A becomes ready for execution.

With reference to FIG. 21, processor task B may yield sub-processing unit SPU1. This yielding action by processor task B may occur due to the programmer having decided that a yield would be beneficial to the overall execution of the software application. In any case, sub-processing unit SPU1 responds to the yield by writing processor task B back into the shared memory 106 and updating the task table. The sub-processing unit SPU1 also accesses the task table to determine which of the plurality of processor tasks in the shared memory 106 should be copied and executed. In this example, processor task A is of a highest priority according to the task table and, therefore, the sub-processing unit SP1 copies processor tasks A from the shared memory 106 into its local memory for execution. At this point, sub-processing unit SP1 executes processor task A and sub-processing unit SP2 continues executing processor task C.

With further reference to FIG. 22, the processor task C may yield the sub-processing unit SPU2 to another processor task. Again, the yield may be invoked through program instructions and/or conditions of the processor task C. In any case, the sub-processing unit SP2 writes the processor task C back into the shared memory 106 and updates the task table accordingly. The sub-processing unit SP2 also accesses the task table to determine which of the processor tasks that are ready to be executed should be copied. In this example, processor task B is ready to be executed and is of the highest priority among the plurality of processor tasks that are ready to be executed. Accordingly, the sub-processor unit SP2 copies the processor task B from the shared memory 106 into its local memory for execution.

A comparison of the processing conditions illustrated in FIG. 20 and the processing conditions illustrated in FIG. 22 reveals that processor task B has migrated from the sub-processing unit SPU1 to the sub-processing unit SPU2.

Figure 24:
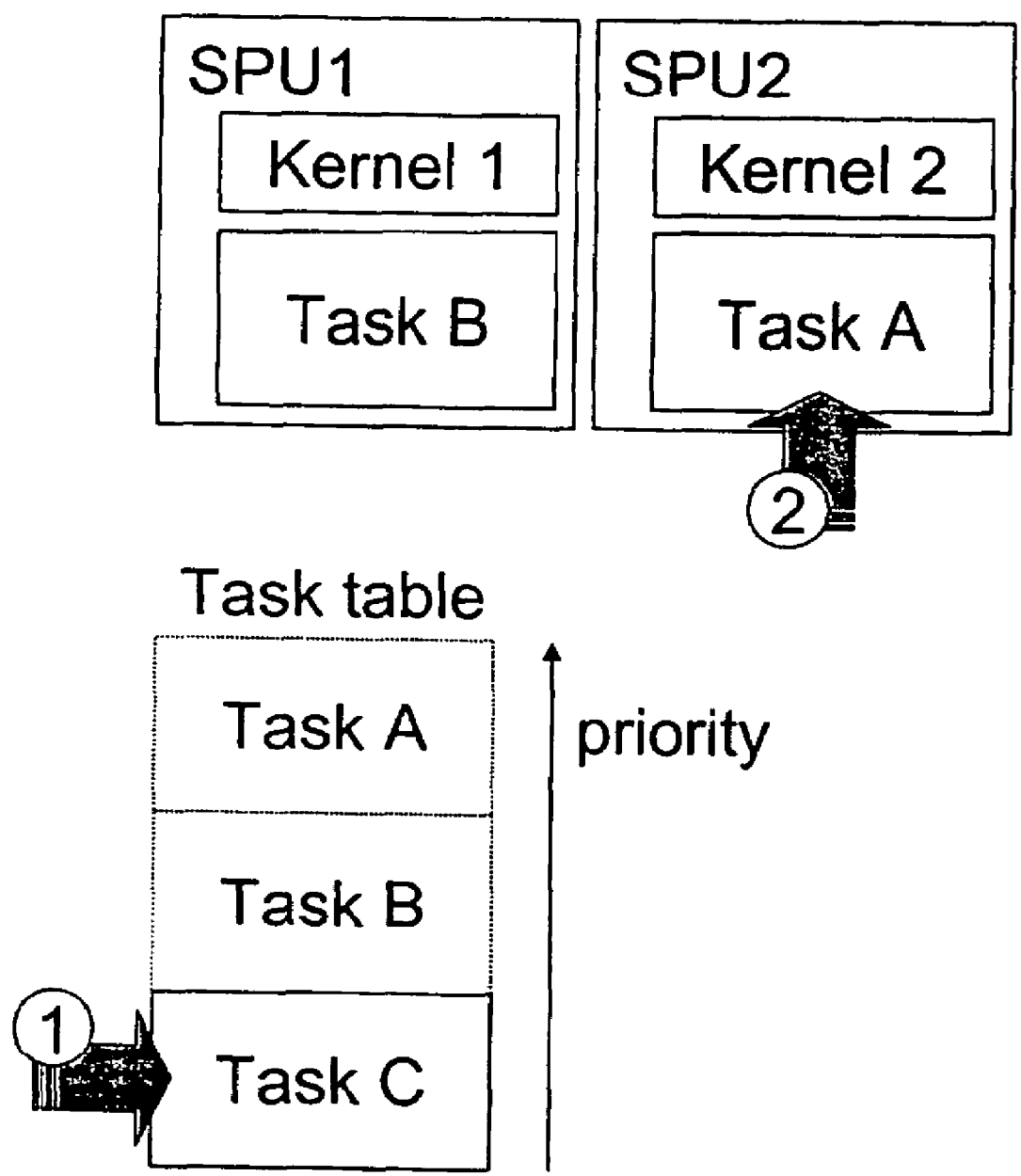
FIG. 24 is a block diagram illustrating further preemptive multi-tasking features of certain aspects of the present invention.

Reference is now made to FIGS. 23-24, which illustrate preemptive multi-tasking aspects of the present invention. These aspects of the present invention provide that a processor task of lower priority running on one of the sub-processing units, such as the sub-processing unit SP2, may be preemptively replaced with a processor task of higher priority, such as processor task A. More particularly, processor task B may be running on the sub-processing unit SP1, while processor task C may be running on the sub-processing unit SPU2 (FIG. 23). Thereafter, a higher priority task, task A, may become ready for execution. This may occur due to some action by another sub-processing unit of the system.

For purposes of discussion, it is assumed that the sub-processing unit SPU1 changed the status of the processor task A to RUNNING, for example, as a result of executing processor task B. As a result, the sub-processing unit SPU1 preferably makes a determination as to whether the priority level of the processor task A is higher than any of the priority levels of the processor tasks running on the other sub-processing units. In this simplified case, the sub-processing unit SPU1 makes a determination as to whether the processor task A is of a higher priority level than the processor task C. If so, the sub-processing unit SP1 at least initiates the replacement of the processor task C with the processor task A. In other words, the sub-processing unit SP1 preferably causes the processor task C to yield the sub-processing unit SPU2 to the processor task A. In this regard, the kernel of the sub-processing unit SPU1 may issue an interrupt to the kernel of the sub-processing unit SPU2. In response to the interrupt, the sub-processing unit SPU2 may write the processor task C back to the shared memory 106 and update the task table (FIG. 24). The sub-processing unit SPU2 may also copy the processor task A from the shared memory to its local memory for execution.

Reference is now made to FIGS. 25-26, which illustrate certain direct migration aspects of the present invention. These aspects provide that a processor task of higher priority running on one of the sub-processing units may be migrated to another of the sub-processing units running a processor task of lower priority. This migration may be in response to a direct interrupt received by the sub-processing unit running the higher priority processor task. With reference to FIG. 25, the sub-processing unit SPU1 may receive an interrupt that indicates that it must execute some other task. The interrupt may also cause the sub-processing unit SPU1 to make a determination as to whether any of the other sub-processing units of the system are executing processing tasks of lower priority. If so, such sub-processing units may yield the execution of the processor task in favor of the higher priority processing task. More particularly, if the sub-processing unit SPU1 determines that the sub-processing unit SPU2 is running a processor task, such as processor task B, of a lower priority than the processor task A, then the kernel of the sub-processing unit SP1 preferably issues an interrupt to the kernel of the sub-processing unit SPU2. In response to the interrupt, the sub-processing unit SPU2 preferably writes the processor task B from its local memory back to the shared memory 106 and updates the task table. The sub-processing unit SPU2 also preferably copies (or moves) the processor task A from the local memory of the sub-processing unit SPU1 to its local memory for execution.

Figure 27:
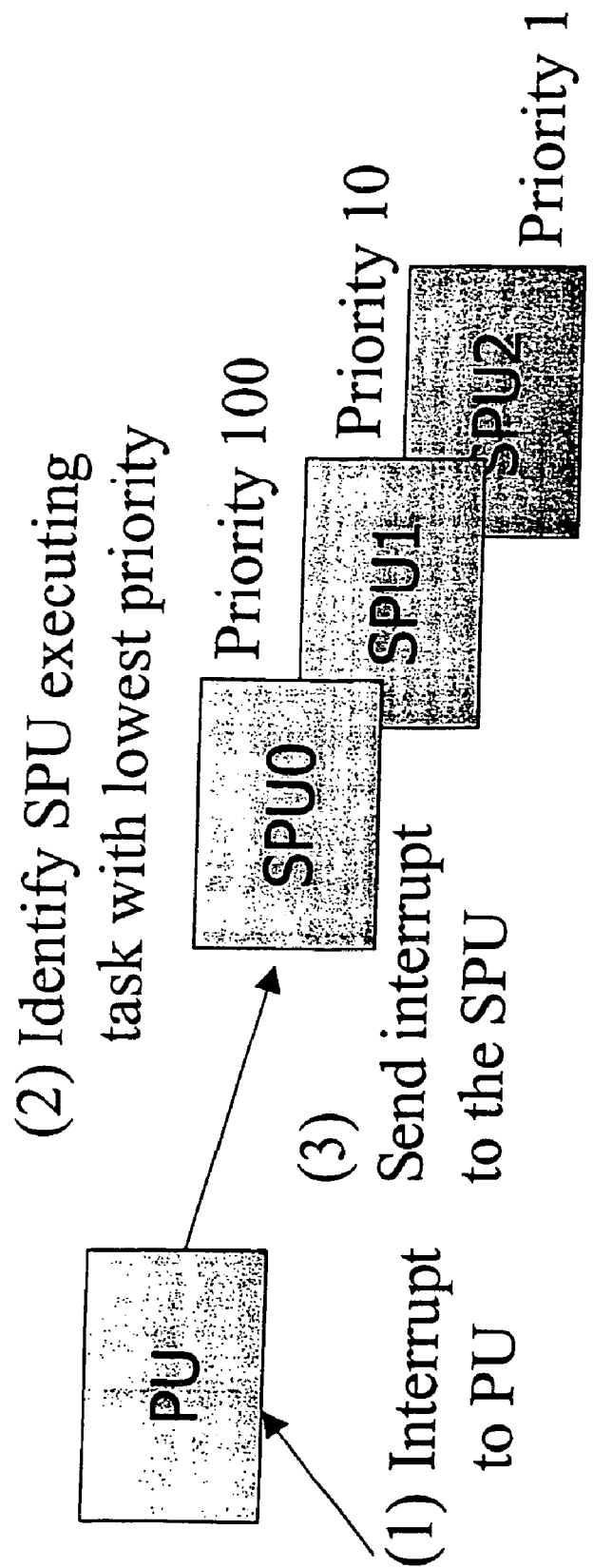
FIG. 27 is a partial block diagram and partial flow diagram illustrating certain processor interrupt techniques in accordance with one or more aspects of the present invention.

FIG. 27 illustrates how a processing unit ("PU") can handle an interrupt in accordance with one aspect of the present invention. In a first step, PU receives an interrupt. The PU then determines which sub-processing unit—in this case, from the group of SPU0, SPU1 and SPU2—has the lowest priority. Then, the PU sends the interrupt to the SPU with the lowest priority. In the case of FIG. 27, SPU2 has the lowest priority, so the PU would send an interrupt to the SPU2.

Figure 28:
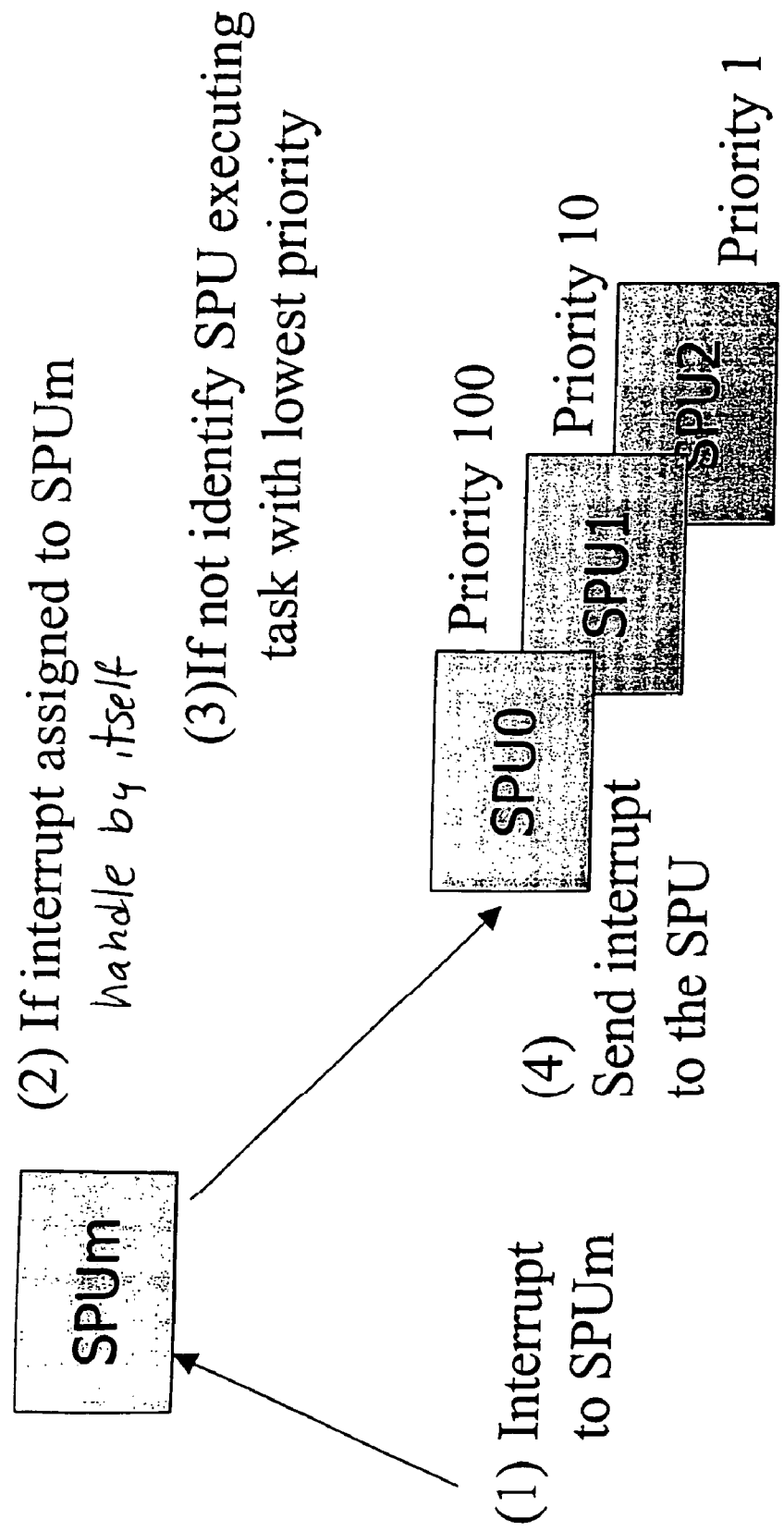
FIG. 28 is a partial block diagram and partial flow diagram illustrating further processor interrupt techniques in accordance with one or more aspects of the present invention.

In accordance with one or more further aspects of the present invention, the interrupt from one of the sub-processing units to another of the sub-processing units may be handled in a number of ways. Reference is now made to FIG. 28, which illustrates how in one embodiment of the present invention, one sub-processing unit may be designated to manage interrupts to any of the other sub-processing units in the system. The designated sub-processing unit receives all such task migration interrupts and either handles them itself or makes a determination as to whether to pass the interrupt on to another sub-processing unit. For example, if the interrupt is intended for the designated sub-processing unit, then it may handle the interrupt itself. Alternatively, if the interrupt is not intended for the designated sub-processing unit, then the designated sub-processing unit may send the interrupt to the sub-processing unit of the group that is executing a processor task of lowest priority.

Figure 29:
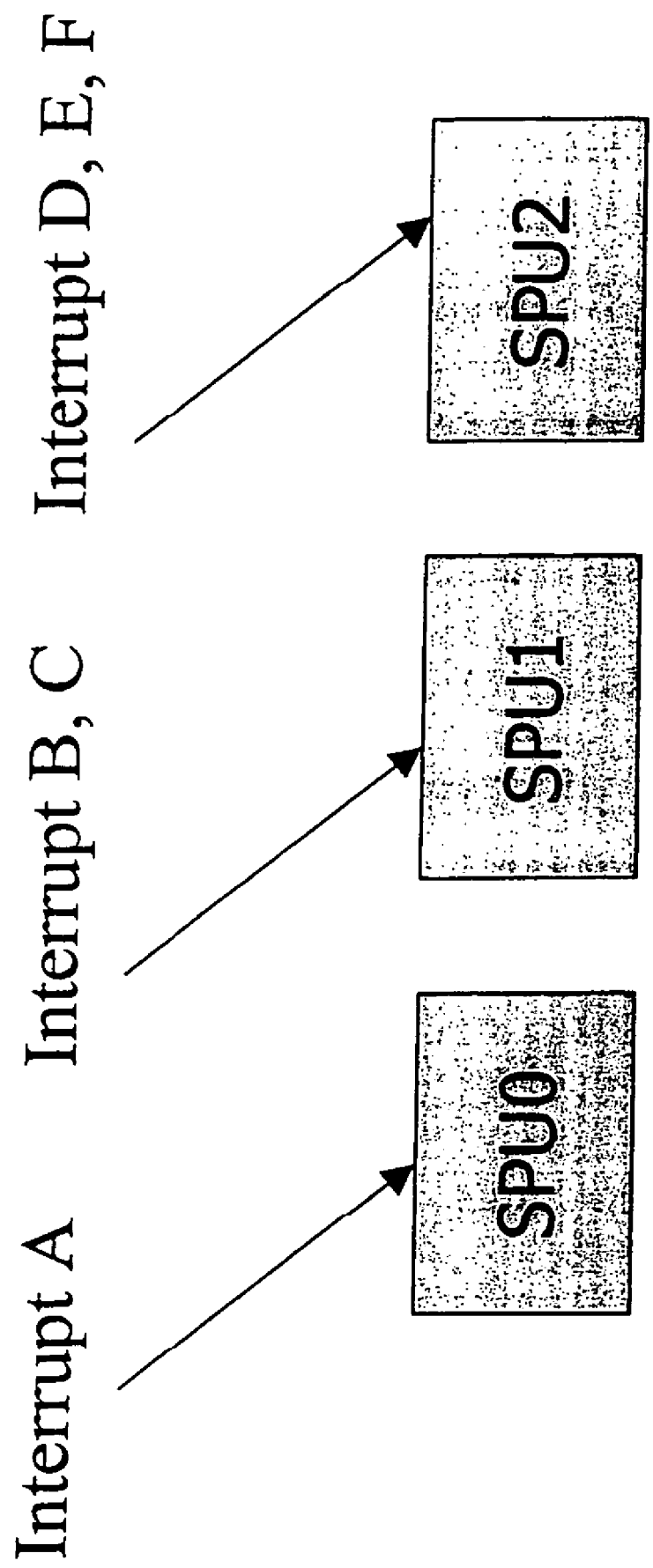
FIG. 29 is a partial block diagram and partial flow diagram illustrating still further processor interrupt techniques in accordance with one or more aspects of the present invention.

FIG. 29 illustrates an alternative approach in which a distributed interrupt handling scheme may be employed. In accordance with this technique, respective interrupts are assigned to each sub-processing unit, for example, interrupt A may be assigned to sub-processing unit SPU0. Interrupts B, C may be assigned to the sub-processing unit SPU1, and interrupt D, E, F may be assigned to the sub-processing unit SPU2.

The discussion hereinabove with respect to FIGS. 23-26 entailed that the sub-processing units be capable of determining the priority levels of the processor tasks running on the other sub-processing units of the system. In accordance with one embodiment of the present invention, the sub-processing units may utilize a shared task priority table in determining the priority levels of the running processor tasks. The shared task priority table may be located in the shared memory and may include a plurality of entries for sub-processing unit identifiers and processor task priority identifiers. For example, the sub-processing unit identifiers may be numerical and/or alphanumerical codes unique to the sub-processing units. The processor task priority identifiers preferably indicate what priority level of the particular processor tasks being executed. Each entry in the shared task priority table preferably includes a pair: a sub-processing unit identifier and a priority identifier, indicative of a priority level of a given processor task running on an associated sub-processing unit. Thus, a sub-processing unit seeking to determine the priority levels of the running processor tasks may access the shared task priority table to find a sub-processing unit running a lower priority processor task. Preferably, the sub-processing unit running a lowest priority processor task is identified for yielding to the higher priority level processor task.

Other embodiments of the present invention may provide that the sub-processing units utilize a shared variable that indicates which sub-processing unit is running a lowest priority processor task. The use of a shared variable is preferably achieved by way of atomic update processes such that accurate indications of priority levels are guaranteed. An alternative approach may utilize a serialized message that is transmitted from one sub-processing unit to another sub-processing unit in series. The message may be updated with the priority level and sub-processing unit identifier of lower priority level processor tasks.

Figure 30:
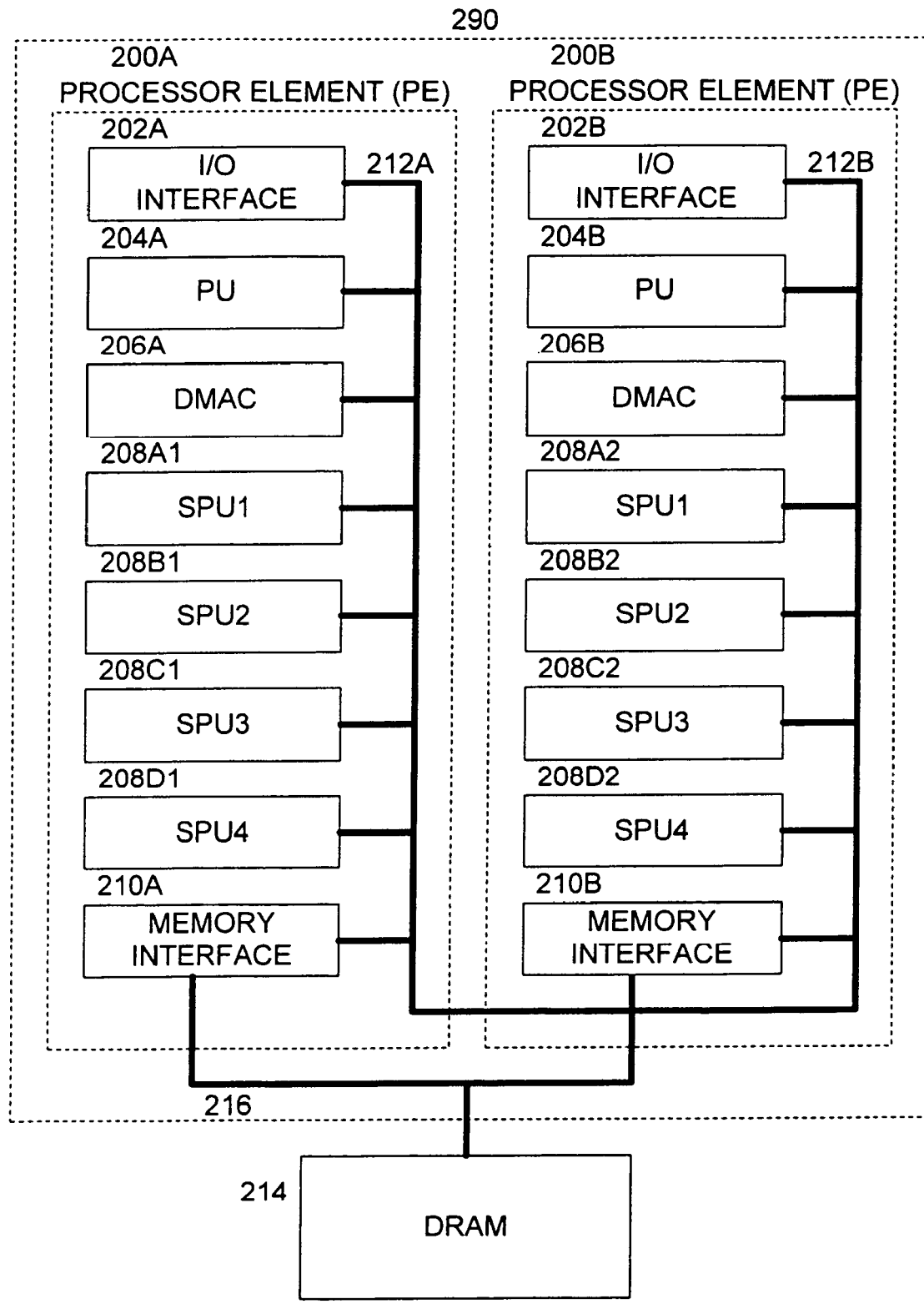
FIG. 30 is a diagram illustrating the structure of a processing system including more than one sub-processing unit in accordance with one or more further aspects of the present invention.

With reference to FIG. 30, alternative embodiments of the present invention contemplate that the number of sub-processing units 208 allocated to execute the processor tasks 110 may be increased by joining a number of processor elements 200 together to provide enhanced processing power. For example, two or more processor elements 200A, 200B may be packaged or joined together, e.g., within one or more chip packages, to form a set of multi-processor units. This configuration may be referred to as a broadband engine (BE). The broadband engine 290 contains the two processor elements 200A, 200B, which are interconnected for data communication over a bus 212. An additional data bus 216 is preferably provided to permit communication between the processor elements 200A, 200B and the shared DRAM 214. One or more input/output (I/O) interfaces 202A and 202B and an external bus (not shown) provide communications between the broadband engine 290 and any external elements. Each of the processor elements 200A and 200B of the broadband engine 290 perform processing of data and applications in a parallel and independent manner analogous to the parallel and independent processing of applications and data performed by the sub-processing elements 208 discussed hereinabove with respect to FIG. 3. In accordance with various aspects of the present invention, the BE may include a single processor element or multiple processing elements. Additionally, a BE may be formed from multi-processing BE's.

Figure 31:
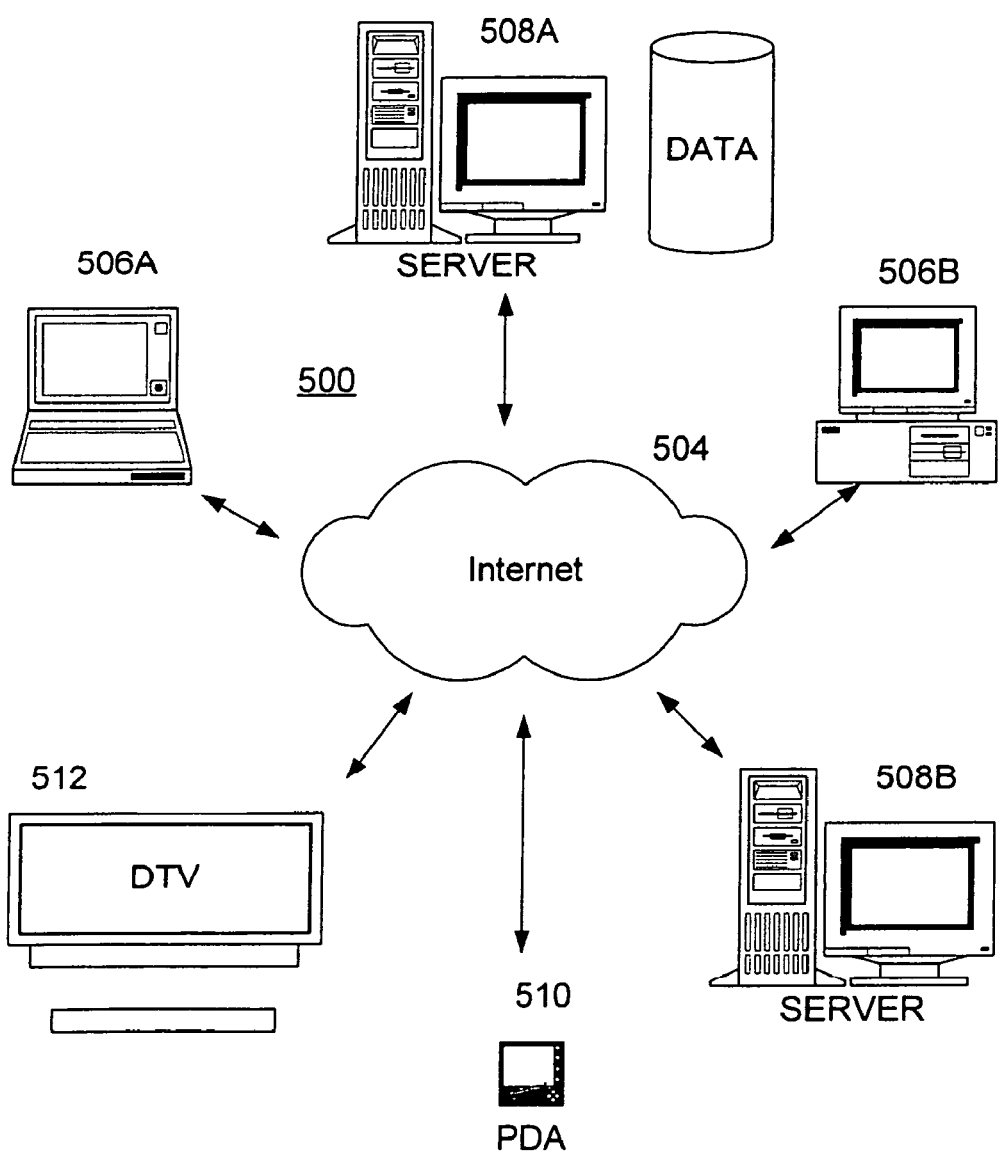
FIG. 31 is a system diagram of a distributed multi-processing system in accordance with one or more aspects of the present invention.

Reference is now made to FIG. 31. Here, the stand-alone multi-processing elements 208 or BEs 290 (sets of multi-processing elements) may be distributed among a plurality of products to form a multi-processing system 500. The elements or members (implemented as computer and/or computing devices) of the system 500 are preferably in communication over a network 504. The network 504 may be a local area network (LAN), a global network, such as the Internet, or any other computer network.

The members that are connected to the network 504 include, e.g., client computers 506, server computers 508, personal digital assistants (PDAs) 510, digital televisions (DTV) 512, and other wired or wireless computers and computing devices. For example, the client 506A may be a laptop computer constructed from one or more of the PEs 200 or other suitable multi-processing systems. The client 506B may be a desk-top computer (or set top box) constructed from one or more of the PEs 200 or other suitable multi-processing systems. Further, the server 506A may be a administrative entity (employing a database capability), which is also preferably constructed from one or more of the PEs 200. And so on.

Figure 32:
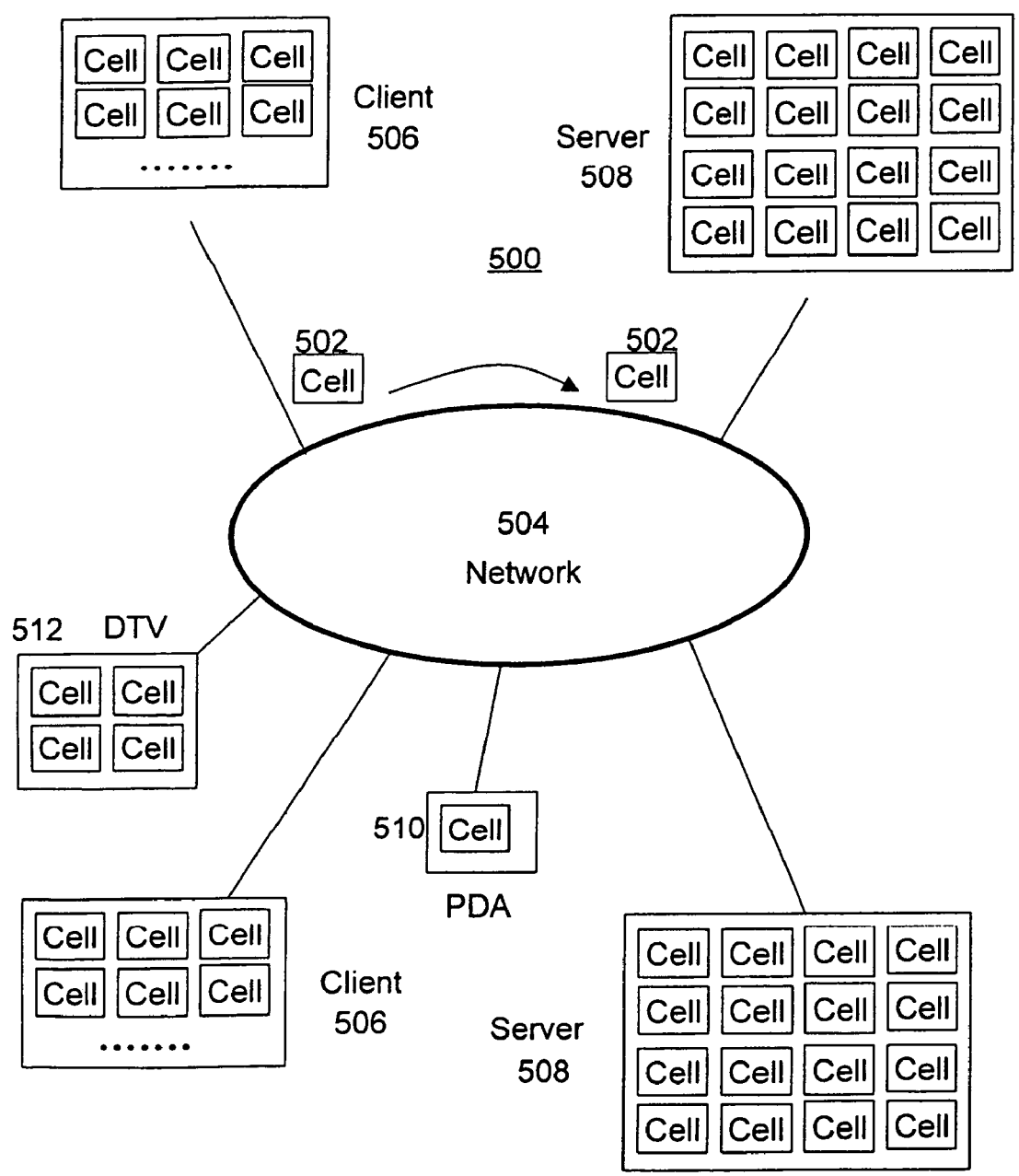
FIG. 32 is a block diagram of a software cell feature that may be used in conjunction with the multi-processing units of the present invention.

Thus, the processing capabilities of the multi-processing system 500 may rely on a plurality of processor elements 200 disposed locally (e.g., one product) or disposed remotely (e.g., in multiple products). In this regard, reference is made to FIG. 32, which is a block diagram of an overall computer network in accordance with one or more aspects of the present invention. Again, the PEs 200 and/or broadband engines 280 (made of multiple PEs) may be used to implement an overall distributed architecture for the computer system 500.

Since the servers 508 of the system 500 perform more processing of data and applications than the clients 506, the servers 508 contain more computing modules (e.g., PEs 200) then the clients 506. The PDAs 510, on the other hand, in this example perform the least amount of processing. Thus, the PDAs 510 contain the smallest number of PEs 200, such as a single PE 200. The DTVs 512 perform a level of processing that is substantially between that of the clients 506 and the servers 508. Thus, the DTVs 512 contain a number of processor elements between that of the clients 506 and the servers 508.

Further details concerning the distributed multi-processing system 500 will now be provided. The homogenous configuration for the system 500 facilitates adaptability, processing speed, and processing efficiency. Because each member of the system 500 performs processing using one or more (or some fraction) of the same computing module, e.g., processor element 200, the particular computer or computing device performing the processing of data and/or application is unimportant because the processing of such data and applications may be shared among the network's members. By uniquely identifying the software cells comprising the data and applications processed by the system 500, the processing results can be transmitted to the computer or computing device requesting the processing regardless of where this processing occurred. Because the modules performing this processing have a common structure and employ a common instruction set architecture, the computational burdens of an added layer of software to achieve compatibility among the processors is avoided. This architecture and programming model facilitates the processing speed necessary to execute, e.g., real-time, multimedia applications.

To take further advantage of the processing speeds and efficiencies facilitated by the system 500, the data and applications processed by this system may be packaged into uniquely identified, uniformly formatted software cells 502. Each software cell 502 contains, or can contain, both applications and data. Each software cell also contains an ID to globally identify the cell throughout the network 504 and the system 500. This uniformity of structure for the software cells, and the software cells unique identification throughout the network, facilitates the processing of applications and data on any computer or computing device of the network 504. For example, a client 506 may formulate a software cell 502 but, because of the limited processing capabilities of the client 506, transmit the software cell 502 to a server 508 for processing. Software cells 502 can migrate, therefore, throughout the network 504 for processing on the basis of the availability of processing resources on the network 504.

The homogenous structure of processors and software cells 502 of the system 500 also avoids many of the problems of today's heterogeneous networks. For example, inefficient programming modules which seek to permit processing of applications on any ISA using any instruction set, e.g., virtual machines such as the Java virtual machine, are avoided. The system 500, therefore, can implement broadband processing far more effectively and efficiently than conventional networks.

Co-assigned U.S. patent application Ser. No. 10/783,238, entitled METHODS AND APPARATUS FOR TASK MANAGEMENT IN A MULTI-PROCESSOR SYSTEM, having and being filed in the United States Patent and Trademark Office on the same date as the present application, is hereby incorporated by reference in its entirety.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of managing processor tasks in a multi-processor computing system, comprising:
    storing the processor tasks in a shared memory that is accessible by a plurality of processing units of the multi-processor computing system;
    permitting the processing units to determine which of the processor tasks should be executed based on priorities of the processor tasks, wherein the processor tasks that are executed are copied from the shared memory to the local memory of a processing unit;
    copying a task table from the shared memory to the local memory of a processing unit, the task table including a task table entry associated with each of the processor tasks;
    modifying the task table entry of a selected one of the processor tasks;
    linking at least some of the task table entries together to achieve at least one list of the processor tasks to be invoked in hierarchical order; and
    copying the task table from the local memory of a processing unit to the shared memory to include the modified task table entry in the task table;
    wherein each of the task table entries includes at least one of: (i) an indication as to whether the associated processor task is ready to be executed by one or more of the processing units; (ii) an indication as to a priority level of the associated processor task; (iii) a pointer to a previous task table entry in a list of task table entries (a previous pointer); and (iv) a pointer to a next task table entry in the list of task table entries.

2. The method of claim 1, wherein the processing units comprise a main processing unit and a plurality of sub-processing units and the sub-processing units access the processor tasks in the shared memory.

3. A method of managing processor tasks in a multi-processor computing system, comprising:
    storing the processor tasks in a shared memory that is accessible by a plurality of processing units of the multi-processor computing system;
    storing a task table in the shared memory, the task table including a task table entry associated with each of the processor tasks;
    linking at least some of the task table entries together to achieve at least one list of the processor tasks to be invoked in hierarchical order; and
    permitting the processing units to use the task table to determine which of the processor tasks should be executed in accordance with the list of processor tasks, wherein the processor tasks that are executed are copied from the shared memory to a local memory of a given one of the processing units;
    copying the task table from the shared memory to the local memory of the given processing unit;
    modifying a selected one of the task table entries; and
    copying the task table from the local memory of the processing unit to the shared memory to include the modified task table entry;
    wherein each of the task table entries includes at least one of: (i) an indication as to whether the associated processor task is ready to be executed by one or more of the processing units (ii) an indication as to a priority level of the associated processor task (iii) a pointer to a previous task table entry in a list of task table entries (a previous pointer and (iv) a pointer to a next task table entry in the list of task table entries.

4. The method of claim 3, further comprising:
    storing a task queue in the shared memory, the task queue including at least one of a head pointer and a tail pointer, the head pointer providing an indication of a first one of the processor tasks in the list of processor tasks, and the tail pointer providing an indication of a last one of the processor tasks in the list of processor tasks; and
    permitting the processing units to use the task table and the task queue to determine which of the processor tasks should be executed in accordance with the list of processor tasks.

5. The method of claim 4, further comprising:
    linking respective groups of the task table entries together to produce respective lists of processor tasks, each list being in hierarchical order; and
    providing that the task queue includes respective task queue entries, each entry including at least one of a head pointer and a tail pointer for each of the lists of processor tasks.

6. The method of claim 5, wherein:
    each of the respective lists are associated with processor tasks of a common priority level; and
    the task queue includes a task queue entry for each of a plurality of priority levels of the processor tasks.

7. The method of claim 4, wherein the plurality of processing units includes a plurality of sub-processing units, each of the sub-processing units having local memory, further comprising:
    copying the task queue and the task table from the shared memory into the local memory of a given one of the sub-processing units;
    searching the task queue for the head pointer to a given one of the processor tasks that is ready to be invoked; and
    copying the given processor task from the shared memory to the local memory of the given sub-processing unit for execution.

8. The method of claim 7, wherein the step of searching the task queue includes searching for the head pointer to a highest priority level one of the processor tasks that is ready to be invoked.

9. The method of claim 7, further comprising: removing the given processor task from the list of processor tasks.

10. The method of claim 9, wherein:
each of the task table entries includes a pointer to a next task table entry; and
the removal step includes using the next pointer of the given task table entry to change the head pointer to identify the new first processor task as being ready to be next invoked.

11. The method of claim 9, wherein:
each of the task table entries includes a pointer to a previous task table entry; and
the method further includes modifying the previous pointer of the last task table entry of the list to point to the task table entry associated with the new first processor task of the list.

12. The method of claim 7, wherein:
each of the task table entries includes an indication as to whether the associated processor task is READY to be executed or is RUNNING on one or more of the sub-processing units; and
the method further includes modifying the given task table entry to indicate that the given processor task is RUNNING.

13. The method of claim 7, further comprising copying the task queue and the task table from the local memory of the given sub-processing unit into the shared memory when the given sub-processing unit has completed its use thereof.

14. The method of claim 13, further comprising: locking the task table prior to copying from the shared memory to the local memory of the given sub-processing unit, and unlocking the task table when the given sub-processing unit has completed its use thereof.

15. A method of managing processor tasks in a multi-processor computing system, comprising:
storing the processor tasks in a shared memory that is accessible by a plurality of processing units of the multi-processor computing system;
storing a task table in the shared memory, the task table including a task table entry associated with each of the processor tasks;
copying the task table from the shared memory to local memory of a given one of the processing units;
linking at least some of the task table entries together to achieve at least one list of processor tasks in hierarchical order;
at least initiating execution a first one of the processor tasks of the list within the given one of the processing units, wherein the first one of the processor tasks yields the given processing unit such that it is capable of executing another of the processor tasks;
determining which of the other processor tasks should be executed next within the given processing unit by permitting the given processing unit to use the task table to make such determination;
modifying the task table entry for the first one of the processor tasks that yields to another one of the processor tasks; and
writing the task table back from local memory of the given processing unit to the shared memory;
wherein each of the task table entries includes at least one of: (i) an indication as to whether the associated processor task is ready to be executed by one or more of the processing units; (ii) an indication as to a priority level of the associated processor task; (iii) a pointer to a previous task table entry in a list of task table entries (a previous pointer); and (iv) a pointer to a next task table entry in the list of task table entries.

16. The method of claim 15, further comprising:
storing a task queue in the shared memory, the task queue including at least one of a head pointer and a tail pointer, the head pointer providing an indication of a new first one of the processor tasks in the list of processor tasks, and the tail pointer providing an indication of a last one of the processor tasks in the list of processor tasks; and
permitting the processing units to use the task table and the task queue to determine which of the processor tasks should be executed next.

17. The method of claim 16, wherein the plurality of processing units include a plurality of sub-processing units, each of the sub-processing units having local memory, and wherein the step of determining includes:
copying the task queue and the task table from the shared memory into a local memory of the given sub-processing unit; and
searching the task queue for the head pointer to the new first processor task that is ready to be invoked.

18. The method of claim 16, further comprising: adding the first processor task back into the list.

19. The method of claim 18, wherein:
each of the task table entries includes a pointer to a next task table entry and pointer to a previous task table entry; and
the step of adding includes modifying the linking of the task table entries to include links to the task table entry associated with the first processor task.

20. The method of claim 19, wherein the step of modifying the linking of the task table entries includes linking the task table entry associated with the first processor task between a prior task table entry and a following task table entry that were previously linked to one another.

21. The method of claim 20, further comprising:
modifying the next pointer of the prior task table entry to point to the task table associated with the first processor task;
modifying the previous pointer of the task table entry associated with the first processor task to point to the prior task table entry;
modifying the next pointer of the task table entry associated with the first processor task to point to the following task table entry; and
modifying the previous pointer of the following task table entry to point to the task table entry associated with the first processor task.

22. A multi-processor apparatus, comprising:
a plurality of processing units, each processing unit including a local memory in which to execute processor tasks;
a shared memory configured to store processor tasks that are ready to be executed, and
a task table including a task table entry associated with each of the processor tasks;
wherein the processing units are configured to determine which of the processor tasks should be executed based on priorities of the processor tasks, the processor tasks that are executed are copied from the shared memory to the local memory of a respective one of the plurality of processing units prior to execution, and
wherein the respective processing unit is configured to copy the task table from the shared memory to the local memory of the respective processing unit, to modify the task table entry of a given one of the processor tasks selected for execution, to link at least some of the task table entries together to achieve at least one list of the processor tasks to be invoked in hierarchical order, and to copy the task table, including the modified task table entry, from the local memory to the shared memory.

23. The apparatus of claim 22, wherein the plurality of processing units comprise a main processing unit and a plurality of sub-processing units and the sub-processor units access the processor tasks in the shared memory.

24. A multi-processor apparatus, comprising:
a plurality of processing units, each processing unit including a local memory in which to execute processor tasks; and
a shared memory configured to store: (i) processor tasks that are ready to be executed, and (ii) a task table including a task table entry associated with each of the processor tasks,
wherein the processing units are configured to copy the task table from shared memory to local memory, to use the task table to determine which of the processor tasks should be copied from the shared memory into their local memories and executed, to maintain and modify the task table during execution of the processor tasks, and to copy the modified task table from the local memory to the shared memory, and
wherein at least some of the task table entries are linked together to achieve at least one list of processor tasks to be invoked in hierarchical order, and the processing units are configured to use the linked list to determine which of the processor tasks should be copied from the shared memory and executed.

25. The apparatus of claim 24, wherein each of the task table entries includes at least one of: (i) an indication as to whether the associated processor task is ready to be executed by one or more of the sub-processing units; (ii) an indication as to a priority level of the associated processor task; (iii) a pointer to a previous task table entry in the list of task table entries; and (iv) a pointer to a next task table entry in the list of task table entries.

26. The apparatus of claim 24, wherein:
the shared memory is further configured to store a task queue having at least one of a head pointer and a tail pointer, the head pointer providing an indication of a first one of the processor tasks in the list of processor tasks, and the tail pointer providing an indication of a last one of the processor tasks in the list; and
the processing units are configured to use the task table and the task queue to determine which of the processor tasks should be executed in accordance with the list of processor tasks.

27. The apparatus of claim 26, wherein the processor tasks that are executed are copied from the shared memory to the local memories of the processing units prior to execution.

28. The apparatus of claim 26, wherein:
respective groups of the task table entries are linked together to produce respective lists of processor tasks, each list being in hierarchical order; and
the task queue includes respective task queue entries, each entry including at least one of a head pointer and a tail pointer for each of the lists of processor tasks.

29. The apparatus of claim 28, wherein:
each of the respective lists are associated with processor tasks of a common priority level; and
the task queue includes a task queue entry for each of a plurality of priority levels of the processor tasks.

30. The apparatus of claim 26, wherein the plurality of processing units includes a plurality of sub-processing units, each of the sub-processing units having local memory, the sub-processing units are configured to:
copy the task queue and the task table from the shared memory into their respective local memories;
search the task queue for the head pointer to a given one of the processor tasks that is ready to be invoked; and
copy the given processor task from the shared memory to the local memory thereof for execution.

31. The apparatus of claim 30, wherein the sub-processing units are configured to search the task queue for the head pointer to a highest priority level one of the processor tasks that is ready to be invoked.

32. The apparatus of claim 30, wherein the sub-processing units are configured to remove the given processor task from the list.

33. The apparatus of claim 32, wherein:
each of the task table entries includes a pointer to a next task table entry; and
the sub-processing units are configured to modify the head pointer to identify the new first processor task as being ready to be next invoked using the next pointer of the given task table entry.

34. The apparatus of claim 32, wherein: each of the task table entries includes a pointer to a previous task table entry; and
the sub-processing units are configured to modify the previous pointer of the last task table entry of the list to point to the task table entry associated with the new first processor task of the list.

35. The apparatus of claim 30, wherein:
each of the task table entries includes an indication as to whether the associated processor task is READY to be executed or is RUNNING on one or more of the sub-processing units; and
the sub-processing units are configured to modify the given task table entry to indicate that the given processor task is RUNNING.

36. The apparatus of claim 30, wherein the sub-processing units are configured to copy the task queue and the task table from the local memory thereof into the shared memory when the given sub-processing unit has completed its use thereof.

37. A multi-processor apparatus, comprising:
a plurality of sub-processing units, each sub-processing unit including a local memory in which to execute processor tasks; and
a shared memory configured to store: (i) processor tasks that are ready to be executed, and (ii) a task table including a task table entry associated with each of the processor tasks, wherein:
the sub-processing units are configured to at least initiate execution a first processor task and yield such that it is capable of executing another of the processor tasks,
the sub-processing units are configured to determine which of the other processor tasks should be executed next based on the task table,
each sub-processing unit is configured to copy the task table from the shared memory to its local memory,
the sub-processing units are configured to modify the task table entry for the first one of the processor tasks that yields to another one of the processor tasks, and
each sub-processing unit is configured to write the task table back from it's local memory to the shared memory;
wherein at least some of the task table entries are linked together to achieve at least one list of processor tasks in hierarchical order.

38. The apparatus of claim 37, wherein:
the shared memory is configured to store a task queue having at least one of a head pointer and a tail pointer, the head pointer providing an indication of a new first one of the processor tasks in the list of processor tasks, and the tail pointer providing an indication of a last one of the processor tasks in the list; and
the sub-processing units are configured to use the task table and the task queue to determine which of the processor tasks should be executed next.

39. The apparatus of claim 38, wherein the sub-processing units are configured to:
copy the task queue and the task table from the shared memory into the local memory thereof and
search the task queue for the head pointer to the new first processor task that is ready to be invoked.

40. The apparatus of claim 38, wherein the sub-processing units are configured to add the first processor task back into the list.

41. The apparatus of claim 40, wherein:
each of the task table entries includes a pointer to a next task table entry and pointer to a previous task table entry; and
the sub-processing units are configured to modify the linking of the task table entries to include links to the task table entry associated with the first processor task.

42. The apparatus of claim 41, wherein the sub-processing units are configured to modify the linking of the task table entries by linking the task table entry associated with the first processor task between a prior task table entry and a following task table entry that were previously linked to one another.

43. The apparatus of claim 42, wherein the sub-processing units are configured to:
modify the next pointer of the prior task table entry to point to the task table associated with the first processor task;
modify the previous pointer of the task table entry associated with the first processor task to point to the prior task table entry;
modify the next pointer of the task table entry associated with the first processor task to point to the following task table entry; and
modify the previous pointer of the following task table entry to point to the task table entry associated with the first processor task.

* * * * *

UNITED STATES PATENT AND TRADEMARK OFFICE
CERTIFICATE OF CORRECTION

PATENT NO.        : 7,614,053 B2
APPLICATION NO. : 10/783246
DATED             : November 3, 2009
INVENTOR(S)       : Inoue et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this

Nineteenth Day of October, 2010

David J. Kappos
*Director of the United States Patent and Trademark Office*

UNITED STATES PATENT AND TRADEMARK OFFICE
CERTIFICATE OF CORRECTION

PATENT NO. : 7,614,053 B2  Page 1 of 1
APPLICATION NO. : 10/783246
DATED : November 3, 2009
INVENTOR(S) : Keisuke Inoue, Tatsuya Iwamoto and Masahiro Yasue It is certified that error appears in the above-identified patent and that said Letters Patent is hereby corrected as shown below:

Col. 1, Line 59, "which are generally" should read -- which is generally --.
Col. 2, Line 54, "lists are associated" should read -- lists is associated --.
Col. 10, Line 5, "words are needed" should read -- words is needed --.
Col. 19, Line 51, "perform" should read -- performs --.
Col. 20, Line 12, "200. A" should read -- 200, a --.
Col. 20, Line 52-53, "facilitates" should read -- facilitate --.
Col. 22, Claim 6, Line 48, "lists are associated" should read -- lists is associated --.
Col. 22, Claim 8, Line 66, "level one" should read -- level of one --.
Col. 23, Claim 15, Line 48, "execution a" should read -- execution of a --.
Col. 25, Claim 29, Line 64, "lists are associated" should read -- lists is associated --.
Col. 26, Claim 31, Line 13, "level one" should read -- level of one --.
Col. 26, Claim 37, Line 53, "execution a" should read -- execution of a --.
Col. 26, Claim 37, Line 64, "it's" should read -- its --.

Signed and Sealed this

Twenty-third Day of November, 2010

David J. Kappos
*Director of the United States Patent and Trademark Office*